US008760776B2

(12) United States Patent
Hsieh et al.

(10) Patent No.: US 8,760,776 B2
(45) Date of Patent: Jun. 24, 2014

(54) OPTICAL IMAGE CAPTURING LENS ASSEMBLY HAVING FOUR LENSES

(75) Inventors: Dung-Yi Hsieh, Taichung (TW); Hsiang-Chi Tang, Taichung (TW); Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 259 days.

(21) Appl. No.: 13/400,790

(22) Filed: Feb. 21, 2012

(65) Prior Publication Data

US 2013/0044379 A1 Feb. 21, 2013

(30) Foreign Application Priority Data

Aug. 15, 2011 (TW) .............................. 100129027 A

(51) Int. Cl.
*G02B 9/34* (2006.01)
*G02B 13/00* (2006.01)
(52) U.S. Cl.
CPC ................................... *G02B 13/004* (2013.01); *G02B 9/34* (2013.01)
USPC .......................................... 359/715; 359/773
(58) Field of Classification Search
CPC ........ G02B 9/34; G02B 13/004; G02B 13/18; G02B 13/0045
USPC .................. 359/773, 715, 714, 766
See application file for complete search history.

(56) References Cited

U.S. PATENT DOCUMENTS

| 7,184,225 | B1 | 2/2007 | Noda |
| 7,365,920 | B2 | 4/2008 | Noda |
| 7,443,611 | B2 | 10/2008 | Shinohara |
| 7,826,149 | B2 * | 11/2010 | Tang et al. ..................... 359/715 |
| 8,045,278 | B2 * | 10/2011 | Shih .............................. 359/715 |

FOREIGN PATENT DOCUMENTS

JP 2007011237 A 1/2007

* cited by examiner

*Primary Examiner* — Zachary Wilkes
(74) *Attorney, Agent, or Firm* — Morris, Manning & Martin, LLP; Tim Tingkang Xia, Esq.

(57) ABSTRACT

This invention provides an optical image capturing lens assembly comprising four lens elements, in order from an object side to an image side: a first lens element with positive refractive power having a convex object-side surface; a second lens element with negative refractive power; a plastic third lens element with positive refractive power having a concave object-side surface and a convex image-side surface, the object-side and image-side surfaces thereof being aspheric; and a plastic fourth lens element with negative refractive power, an object-side surface and an image-side surface thereof being aspheric, at least one inflection point being formed on at least one of the object-side and image-side surfaces thereof. With the aforementioned arrangement, the total track length of the lens assembly can be effectively reduced, the sensitivity of the system can be attenuated and the image quality can be improved.

22 Claims, 18 Drawing Sheets

OPTICAL IMAGE CAPTURING LENS ASSEMBLY HAVING FOUR LENSES

CROSS-REFERENCE TO RELATED APPLICATIONS

This non-provisional application claims priority under 35 U.S.C. §119(a) on Patent Application No. 100129027 filed in Taiwan, R.O.C. on Aug. 15, 2011, the entire contents of which are hereby incorporated by reference.

BACKGROUND OF THE INVENTION

1. Field of the Invention

The present invention relates to an optical image capturing lens assembly, and more particularly to a compact optical image capturing lens assembly applicable to electronic products as well as the extended usage in the three-dimensional imaging lens assembly.

2. Description of the Prior Art

In recent years, with the popularity of compact photographing lens assembly, the demand for compact image capturing modules is increasing, and the sensor of general photographing lens assembly is none other than CCD (Charge Coupled Device) or CMOS Sensor (Complementary Metal Oxide Semiconductor Sensor). Furthermore, as advances in semiconductor manufacturing technology have allowed the pixel size of sensors to be reduced and electronic products have become more compact and powerful, there is an increasing demand for compact photographing lens assembly featuring better image quality.

Generally, a conventional compact photographing lens assembly for portable electronic devices, such as the one disclosed in U.S. Pat. No. 7,184,225, is of a triplet type comprising, in order from the object side to the image side: a first lens element with positive refractive power; a second lens element with positive refractive power; and a third lens element with negative refractive power.

With advances in semiconductor manufacturing technology and current trend of compact electronic products, the three-element lens has become insufficient for a high-end photographing optical system due to the increasing demand for a higher image quality.

A conventional high-resolution photographing lens assembly, such as the one set forth in U.S. Pat. No. 7,365,920, generally has a front stop and four lens elements, wherein two spherical-surface glass lenses serving as the first and second lens elements are adhered together to form a doublet for correcting the chromatic aberration. Such an arrangement of optical elements, however, has the following disadvantages: (1) the degree of freedom of the system is curtailed due to the employment of excess number of spherical-surface lenses, thus the total track length of the system cannot be reduced easily; (2) the process of adhering glass lenses together is complicated, posing difficulties in manufacturing. Moreover, as the size of the image capturing lens assembly is becoming smaller and the specification thereof is becoming higher, assembling lens elements tightly within a limited space predisposes unwanted light rays to be reflected for many times within a lens barrel, which will affect image quality. Thus, the unwanted light rays should be prevented from entering the image forming area so as to improve image quality. Inasmuch as the foregoing, a need exists in the art for a photographing optical system that features better image quality and a moderate total track length and is applicable to compact portable electronic devices.

SUMMARY OF THE INVENTION

The present invention provides an optical image capturing lens assembly comprising four lens elements, in order from an object side to an image side: a first lens element with positive refractive power having a convex object-side surface; a second lens element with negative refractive power; a plastic third lens element with positive refractive power having a concave object-side surface and a convex image-side surface, the object-side and image-side surfaces thereof being aspheric; and a plastic fourth lens element with negative refractive power, an object-side surface and an image-side surface thereof being aspheric, at least one inflection point being formed on at least one of the object-side and image-side surfaces thereof; wherein an axial distance between the object-side surface of the first lens element and the image-side surface of the fourth lens element is Td, a curvature radius of the object-side surface of the first lens element is R1, a curvature radius of an image-side surface of the first lens element is R2, and they satisfy the following relations: $1.25 \text{ mm} < Td < 1.75 \text{ mm}$; and $-4.0 < (R1+R2)/(R1-R2) < -1.3$.

The present invention provides another optical image capturing lens assembly comprising four lens elements, in order from an object side to an image side: a first lens element with positive refractive power having a convex object-side surface; a plastic second lens element with negative refractive power, at least one of an object-side surface and an image-side surface thereof being aspheric; a plastic third lens element with positive refractive power having a concave object-side surface and a convex image-side surface, the object-side and image-side surfaces thereof being aspheric; and a plastic fourth lens element with negative refractive power having a concave image-side surface, an object-side surface and the image-side surface thereof being aspheric, at least one inflection point being formed on at least one of the object-side and image-side surfaces thereof; wherein a maximum central thickness of individual lens elements of the optical image capturing lens assembly is CTmax, a minimum central thickness of individual lens elements of the optical image capturing lens assembly is CTmin, a curvature radius of the object-side surface of the first lens element is R1, a curvature radius of an image-side surface of the first lens element is R2, and they satisfy the following relations: $0.25 \text{ mm} < CTmax < 0.50 \text{ mm}$; $0.11 \text{ mm} < CTmin < 0.25 \text{ mm}$; and $-4.0 < (R1+R2)/(R1-R2) < -1.3$.

The present invention provides yet another optical image capturing lens assembly comprising four lens elements, in order from an object side to an image side: a first lens element with positive refractive power having a convex object-side surface; a plastic second lens element with negative refractive power, at least one of an object-side surface and an image-side surface thereof being aspheric; a plastic third lens element with positive refractive power having a concave object-side surface and a convex image-side surface, the object-side and image-side surfaces thereof being aspheric; and a plastic fourth lens element with negative refractive power having a concave image-side surface, an object-side surface and the image-side surface thereof being aspheric, at least one inflection point being formed on at least one of the object-side and image-side surfaces thereof; wherein an axial distance between the object-side surface of the first lens element and the image-side surface of the fourth lens element is Td, a focal length of the optical image capturing lens assembly is f, a curvature radius of the object-side surface of the fourth lens element is R7, and they satisfy the following relations: $1.3 \text{ mm} < Td < 1.6 \text{ mm}$; and $|f/R7| < 0.25$.

With the aforementioned arrangement of lens elements, the total track length of the lens assembly can be effectively reduced, the sensitivity of the system can be attenuated and the image quality can be improved.

In the present optical image capturing lens assembly, the first lens element with positive refractive power provides partial refractive power for the system, thereby favorably reducing the total track length of the system. The second lens element has negative refractive power so as to effectively correct the aberration generated by the first lens element with positive refractive power and to favorably correct the chromatic aberration of the system. The third lens element with positive refractive power cooperates with the first lens element with positive refractive power to attenuate the sensitivity of the system. The fourth lens element with negative refractive power provides partial negative refractive power for the system so that the high order aberrations of the system can be effectively corrected to improve the image resolution of the optical image capturing lens assembly.

In the present optical image capturing lens assembly, the first lens element may be a bi-convex lens element or a meniscus lens element having a convex object-side surface and a concave image-side surface. When the first lens element is a bi-convex lens element, the refractive power thereof can be effectively enhanced, thereby shortening the total track length of the system. When the first lens element is a meniscus lens element having a convex object-side surface and a concave image-side surface, the astigmatism of the system can be corrected more favorably. When the second lens element is a meniscus lens element having a convex object-side surface and a concave image-side surface, the astigmatism and aberration generated by the first lens element can be favorably corrected. When the second lens element is a bi-concave lens element, the negative refractive power thereof can be effectively enhanced, thereby the aberrations of the system can be corrected more effectively. When the third lens element has a concave object-side surface and a convex image-side surface, the astigmatism and high order aberrations of the system can be favorably corrected. When the fourth lens element has a concave image-side surface, the principal point of the optical system can be positioned away from the image plane, thereby the total track length of the system can be favorably shortened to reduce the size of the lens assembly. Moreover, the fourth lens element is provided with at least one inflection point, thereby the angle at which the light is projected onto the sensor from the off-axis field can be effectively reduced to further correct the off-axis aberrations.

DETAILED DESCRIPTION OF THE PREFERRED EMBODIMENTS

Figure 1A:
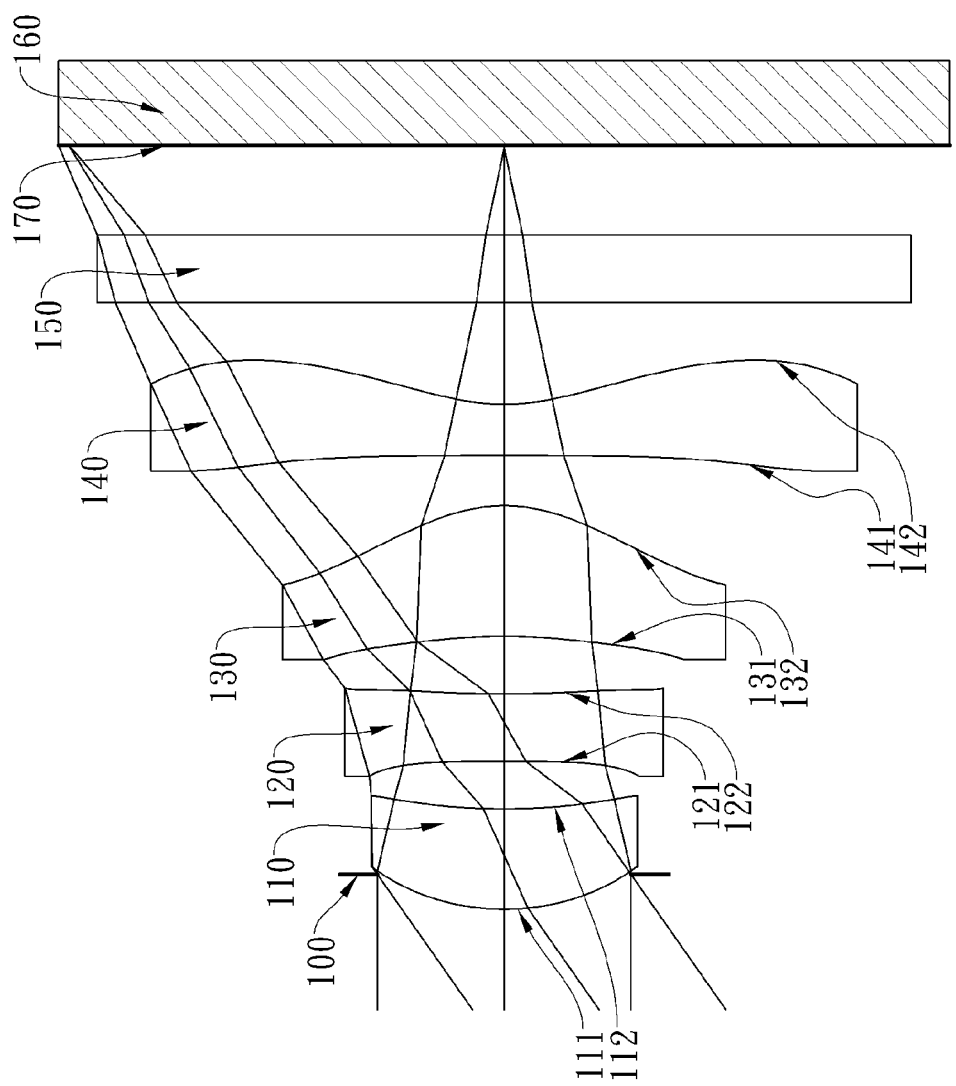
FIG. 1A shows an optical image capturing lens assembly in accordance with a first embodiment of the present invention.

The present invention provides an optical image capturing lens assembly comprising four lens elements, in order from an object side to an image side: a first lens element with positive refractive power having a convex object-side surface; a second lens element with negative refractive power; a plastic third lens element with positive refractive power having a concave object-side surface and a convex image-side surface, the object-side and image-side surfaces thereof being aspheric; and a plastic fourth lens element with negative refractive power, an object-side surface and an image-side surface thereof being aspheric, at least one inflection point being formed on at least one of the object-side and image-side surfaces thereof; wherein an axial distance between the object-side surface of the first lens element and the image-side surface of the fourth lens element is Td, a curvature radius of the object-side surface of the first lens element is R1, a curvature radius of an image-side surface of the first lens element is R2, and they satisfy the following relations: 1.25 mm<Td<1.75 mm; and −4.0<(R1+R2)/(R1−R2)<−1.3.

When the relation of 1.25 mm<Td<1.75 mm is satisfied, the lens assembly can maintain a compact form so that it can be equipped in compact portable electronic products.

When the relation of −4.0<(R1+R2)/(R1−R2)<−1.3 is satisfied, the spherical aberrations can be effectively corrected. Preferably, R1 and R2 satisfy the following relation: −3.0<(R1+R2)/(R1−R2)<−1.65.

In the aforementioned optical image capturing lens assembly, an Abbe number of the first lens element is V1, an Abbe number of the second lens element is V2, and they preferably satisfy the following relation: 30<V1−V2<45. The satisfaction of the above relation facilitates the correction of the chromatic aberration of the optical image capturing lens assembly.

The aforementioned optical image capturing lens assembly further comprises a stop. An axial distance between the stop and the image-side surface of the fourth lens element is SD, the axial distance between the object-side surface of the first lens element and the image-side surface of the fourth lens element is Td, and they preferably satisfy the following relation: $0.85<SD/Td<1.1$. When the above relation is satisfied, a good balance between the telecentric feature and the wide angle of view can be attained.

In the aforementioned optical image capturing lens assembly, a focal length of the optical image capturing lens assembly is f, a focal length of the third lens element is f3, a focal length of the fourth lens element is f4, and they preferably satisfy the following relations: $0.2<f3/f<0.65$; and $-0.65<f4/f<-0.2$. When the above relations are satisfied, the positive refractive power of the first lens element can be effectively distributed to attenuate the sensitivity of the system. And it will be more preferable that f, f3 and f4 satisfy the following relations: $0.2<f3/f<0.5$, $-0.5<f4/f<-0.2$.

In the aforementioned optical image capturing lens assembly, an axial thickness of the second lens element is CT2, an axial thickness of the fourth lens element is CT4, and they preferably satisfy the following relation: $0.2\text{ mm}<CT2+CT4<0.46\text{ mm}$. When the above relation is satisfied, the thickness of the second lens element and the fourth lens element is more appropriate, thereby facilitating the assembly and space arrangement of the lens assembly.

In the aforementioned optical image capturing lens assembly, the focal length of the optical image capturing lens assembly is f, a curvature radius of the object-side surface of the fourth lens element is R7, and they preferably satisfy the following relation: $|f/R7|<0.25$. When the above relation is satisfied, the aberrations of the system can be prevented from being generated so that the high order aberrations can be corrected.

In the aforementioned optical image capturing lens assembly, the focal length of the optical image capturing lens assembly is f, and it preferably satisfies the following relation: $1.5\text{ mm}<f<2.2\text{ mm}$. The satisfaction of the above relation facilitates a reduction in the size of the lens assembly and enables the whole camera module to stay compact.

The present invention provides another optical image capturing lens assembly comprising four lens elements, in order from an object side to an image side: a first lens element with positive refractive power having a convex object-side surface; a plastic second lens element with negative refractive power, at least one of an object-side surface and an image-side surface thereof being aspheric; a plastic third lens element with positive refractive power having a concave object-side surface and a convex image-side surface, the object-side and image-side surfaces thereof being aspheric; and a plastic fourth lens element with negative refractive power having a concave image-side surface, an object-side surface and the image-side surface thereof being aspheric, at least one inflection point being formed on at least one of the object-side and image-side surfaces thereof; wherein a maximum central thickness of individual lens elements of the optical image capturing lens assembly is CTmax, a minimum central thickness of individual lens elements of the optical image capturing lens assembly is CTmin, a curvature radius of the object-side surface of the first lens element is R1, a curvature radius of an image-side surface of the first lens element is R2, and they satisfy the following relations: $0.25\text{ mm}<CTmax<0.50\text{ mm}$; $0.11\text{ mm}<CTmin<0.25\text{ mm}$; and $-4.0<(R1+R2)/(R1-R2)<-1.3$.

When the relation of $0.25\text{ mm}<CTmax<0.50\text{ mm}$ as well as the relation of $0.11\text{ mm}<CTmin<0.25\text{ mm}$ are satisfied, the property of individual lens thickness is proper. The lens manufacturing yield along with the moldability and homogeneity of the plastic-injection-molded lens elements can be improved.

When the relation of $-4.0<(R1+R2)/(R1-R2)<-1.3$ is satisfied, the spherical aberrations can be effectively corrected.

In the aforementioned optical image capturing lens assembly, the following relations can be satisfied: $0.2<f3/f<0.65$ and $-0.65<f4/f<-0.2$; $30<V1-V2<42$; $|f/R7|<0.25$; and $1.5\text{ mm}<f<2.2\text{ mm}$. When the above relations are satisfied, numerous improvements mentioned in the previous paragraphs are made, such as correcting different types of optical aberrations as well as the size reduction of the optical image capturing lens assembly.

The present invention provides yet another optical image capturing lens assembly comprising four lens elements, in order from an object side to an image side: a first lens element with positive refractive power having a convex object-side surface; a plastic second lens element with negative refractive power, at least one of an object-side surface and an image-side surface thereof being aspheric; a plastic third lens element with positive refractive power having a concave object-side surface and a convex image-side surface, the object-side and image-side surfaces thereof being aspheric; and a plastic fourth lens element with negative refractive power having a concave image-side surface, an object-side surface and the image-side surface thereof being aspheric, at least one inflection point being formed on at least one of the object-side and image-side surfaces thereof; wherein an axial distance between the object-side surface of the first lens element and the image-side surface of the fourth lens element is Td, a focal length of the optical image capturing lens assembly is f, a curvature radius of the object-side surface of the fourth lens element is R7, and they satisfy the following relations: $1.3\text{ mm}<Td<1.6\text{ mm}$; and $|f/R7|<0.25$.

When the relation of $1.3\text{ mm}<Td<1.6\text{ mm}$ is satisfied, the lens assembly can maintain a compact form so that it can be equipped in compact portable electronic products.

When the relation of $|f/R7|<0.25$ is satisfied, the aberrations of the system can be prevented from being generated, so that the high order aberrations can be corrected.

In the aforementioned optical image capturing lens assembly, the following relation can be satisfied: $-4.0<(R1+R2)/(R1-R2)<-1.3$; $0.2\text{ mm}<CT2+CT4<0.46\text{ mm}$; $0.2<f3/f<0.65$ and $-0.65<f4/f<-0.2$; $30<V1-V2<42$; $1.5\text{ mm}<f<2.2\text{ mm}$. When the above relation is satisfied, numerous improvements mentioned in the previous paragraphs are made, such as correcting different types of optical aberrations as well as the size reduction of the optical image capturing lens assembly.

In the present optical image capturing lens assembly, the lens elements can be made of glass or plastic material. If the lens elements are made of glass, there is more freedom in distributing the refractive power of the optical image capturing lens assembly. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the total required number of the lens elements within an optical system. Consequently, the total track length of the optical image capturing lens assembly can be effectively reduced.

In the present optical image capturing lens assembly, if a lens element has a convex surface, it means the surface in proximity to the optical axis is convex; if a lens element has a concave surface, it means the surface in proximity to the optical axis is concave.

The present optical image capturing lens assembly can be provided with at least one stop, such as a glare stop or a field stop, to eliminate stray light, thereby the image quality can be favorably improved. Additionally, there can be an aperture stop allocated in front, within, or in the rear of the optical image capturing lens assembly, according to the preference of the optical designer.

Preferred embodiments of the present invention will be described in the following paragraphs by referring to the accompanying drawings.

Embodiment 1

Figure 1B:
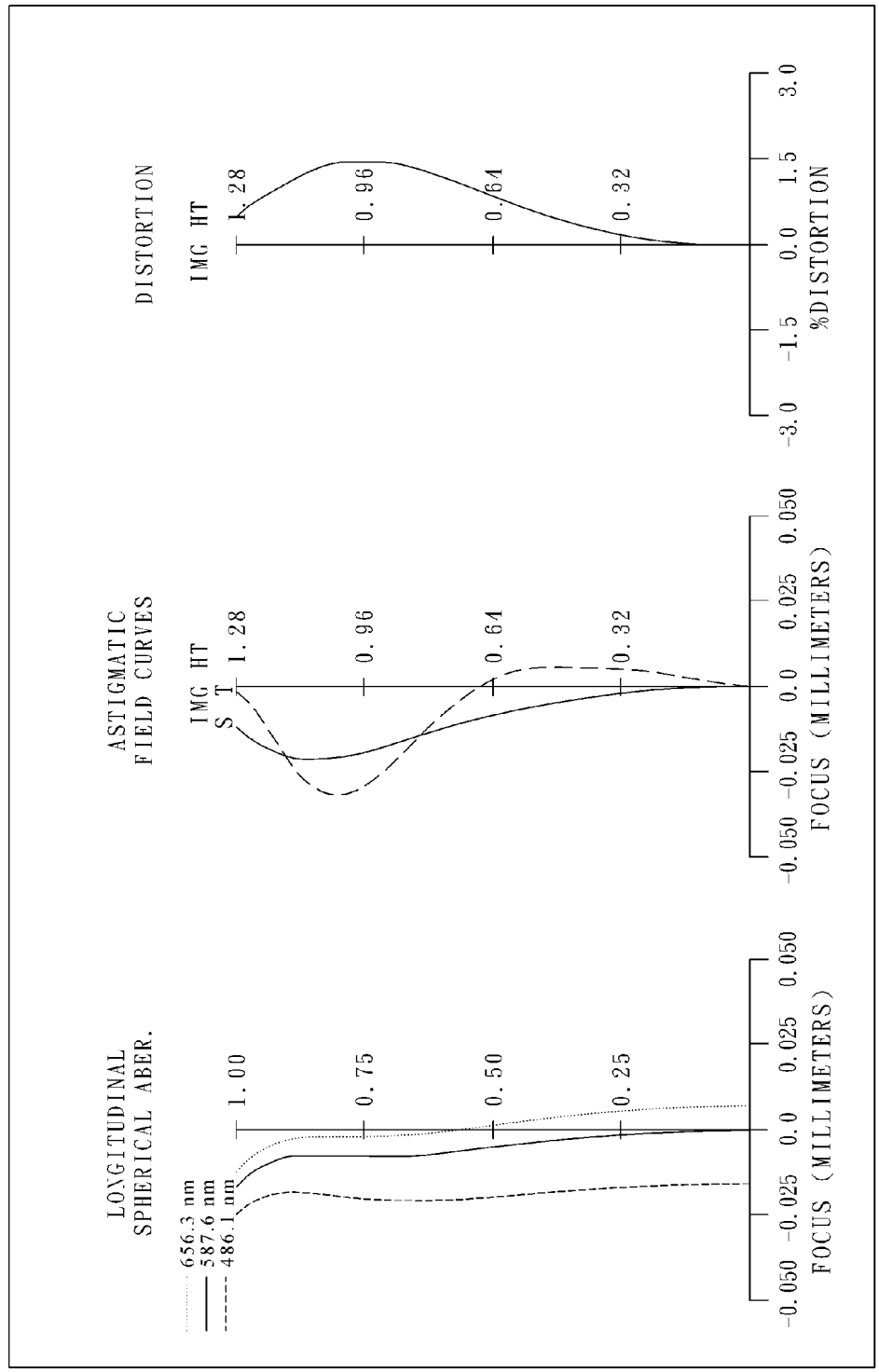
FIG. 1B shows the aberration curves of the first embodiment of the present invention.

FIG. 1A shows an optical image capturing lens assembly in accordance with a first embodiment of the present invention, and FIG. 1B shows the aberration curves of the first embodiment of the present invention. The optical image capturing lens assembly of the first embodiment of the present invention mainly comprises four lens elements, in order from an object side to an image side:

a plastic first lens element 110 with positive refractive power having a convex object-side surface 111 and a concave image-side surface 112, the object-side and image-side surfaces 111 and 112 thereof being aspheric;

a plastic second lens element 120 with negative refractive power having a concave object-side surface 121 and a concave image-side surface 122, the object-side and image-side surfaces 121 and 122 thereof being aspheric;

a plastic third lens element 130 with positive refractive power having a concave object-side surface 131 and a convex image-side surface 132, the object-side and image-side surfaces 131 and 132 thereof being aspheric; and a plastic fourth lens element 140 with negative refractive power having a concave object-side surface 141 and a concave image-side surface 142, the object-side and image-side surfaces 141 and 142 thereof being aspheric, at least one inflection point being formed on at least one of the object-side and image-side surfaces 141 and 142 thereof.

The optical image capturing lens assembly is also provided with a stop 100 disposed between an imaged object and the first lens element 110.

The optical image capturing lens assembly further comprises an IR-filter 150 disposed between the image-side surface 142 of the fourth lens element 140 and an image plane 161; the IR-filter 150 is made of glass and has no influence on the focal length of the optical image capturing lens assembly. Moreover, an image sensor 160 is disposed on the image plane 161.

The detailed optical data of the first embodiment is shown in TABLE 1, and the aspheric surface data is shown in TABLE 2, wherein the units of the curvature radius, the thickness and the focal length are expressed in mm, and HFOV is half of the maximal field of view.

TABLE 1

(Embodiment 1)
f = 1.83 mm, Fno = 2.45, HFOV = 35.0 deg.

| Surface # | | Curvature radius | Thickness | Material | Refractive Index | Abbe # | Focal Length |
|---|---|---|---|---|---|---|---|
| 0 | Object | Plano | Infinity | | | | |
| 1 | Stop | Plano | −0.103 | | | | |
| 2 | Lens 1 | 0.697980 (ASP) | 0.296 | Plastic | 1.544 | 55.9 | 1.93 |
| 3 | | 1.767500 (ASP) | 0.140 | | | | |
| 4 | Lens 2 | −40.000000 (ASP) | 0.200 | Plastic | 1.634 | 23.8 | −5.06 |
| 5 | | 3.495600 (ASP) | 0.170 | | | | |
| 6 | Lens 3 | −1.774860 (ASP) | 0.386 | Plastic | 1.544 | 55.9 | 1.01 |
| 7 | | −0.451640 (ASP) | 0.148 | | | | |
| 8 | Lens 4 | −48.997468 (ASP) | 0.151 | Plastic | 1.544 | 55.9 | −1.06 |
| 9 | | 0.586883 (ASP) | 0.300 | | | | |
| 10 | IR-filter | Plano | 0.200 | Glass | 1.516 | 64.1 | — |
| 11 | | Plano | 0.265 | | | | |
| 12 | Image Plane | Plano | — | | | | |

\* Reference Wavelength is d-line 587.6 nm

TABLE 2

Aspheric Coefficients

| Surface # | 2 | 3 | 4 | 5 |
|---|---|---|---|---|
| k = | −2.30639E−02 | −6.40089E+01 | −1.03750E+01 | 5.00000E+01 |
| A4 = | 1.01255E−01 | 1.36386E+00 | −8.37712E−01 | −2.17028E−01 |
| A6 = | 1.01268E+00 | −1.23461E+01 | −6.39382E+00 | −4.59230E+00 |
| A8 = | −7.28074E−01 | 8.75170E+01 | −1.62265E+01 | 1.12610E+01 |
| A10 = | 5.10972E+00 | −2.99976E+02 | 5.19864E+02 | |
| A12 = | | | −2.33163E+03 | |

| Surface # | 6 | 7 | 8 | 9 |
|---|---|---|---|---|
| k = | 1.03451E+00 | −3.69369E+00 | 1.00000E+00 | −7.69483E+00 |
| A4 = | 1.54049E−01 | −8.79702E−01 | −4.32267E−02 | −4.65002E−01 |
| A6 = | 3.86754E+00 | 5.69650E+00 | −1.52547E−01 | 7.12124E−01 |
| A8 = | 3.16653E+00 | −8.45199E+00 | −1.89799E−02 | −1.01281E+00 |
| A10 = | −2.98162E+02 | −3.67967E+00 | 6.04631E−01 | 8.86982E−01 |
| A12 = | 1.70372E+03 | −1.12074E+01 | −6.25460E−01 | −4.68277E−01 |
| A14 = | −4.24391E+03 | 1.10455E+02 | 2.27053E−01 | 1.31208E−01 |
| A16 = | 4.32651E+03 | −1.24463E+02 | −2.71139E−02 | −1.24908E−02 |

The equation of the aspheric surface profiles is expressed as follows:

$$X(Y) = (Y^2/R)/(1 + \text{sqrt}(1 - (1+k)*(Y/R)^2)) + \sum_i (Ai)*(Y^i)$$

wherein:

X: the distance of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present optical image capturing lens assembly, the focal length of the optical image capturing lens assembly is f, and it satisfies the relation: f=1.83 (mm).

In the first embodiment of the present optical image capturing lens assembly, the f-number of the optical image capturing lens assembly is Fno, and it satisfies the relation: Fno=2.45.

In the first embodiment of the present optical image capturing lens assembly, half of the maximal field of view of the optical image capturing lens assembly is HFOV, and it satisfies the relation: HFOV=35.0 deg.

In the first embodiment of the present optical image capturing lens assembly, the Abbe number of the first lens element 110 is V1, the Abbe number of the second lens element 120 is V2, and they satisfy the relation: V1−V2=32.1.

In the first embodiment of the present optical image capturing lens assembly, the maximum central thickness of individual lens elements of the optical image capturing lens assembly is CTmax, and it satisfies the relation: CTmax=0.39 mm.

In the first embodiment of the present optical image capturing lens assembly, the minimum central thickness of individual lens elements of the optical image capturing lens assembly is CTmin, and it satisfies the relation: CTmin=0.15 mm.

In the first embodiment of the present optical image capturing lens assembly, the axial distance between the object-side surface 111 of the first lens element 110 and the image-side surface 142 of the fourth lens element 140 is Td, and it satisfies the relation: Td=1.49 mm.

In the first embodiment of the present optical image capturing lens assembly, the curvature radius of the object-side surface 111 of the first lens element 110 is R1, the curvature radius of the image-side surface 112 of the first lens element 110 is R2, and they satisfy the relation: (R1+R2)/(R1−R2)=−2.31.

In the first embodiment of the present optical image capturing lens assembly, the focal length of the optical image capturing lens assembly is f, the curvature radius of the object-side surface 141 of the fourth lens element 140 is R7, and they satisfy the relation: |f/R7|=−0.04.

In the first embodiment of the present optical image capturing lens assembly, the focal length of the optical image capturing lens assembly is f, the focal length of the third lens element 130 is f3, and they satisfy the relation: f3/f=0.55.

In the first embodiment of the present optical image capturing lens assembly, the focal length of the optical image capturing lens assembly is f, the focal length of the fourth lens element 140 is f4, and they satisfy the relation: f4/f=−0.58.

In the first embodiment of the present optical image capturing lens assembly, the axial distance between the stop 100 and the image-side surface 142 of the fourth lens element 140 is SD, the axial distance between the object-side surface 111 of the first lens element 110 and the image-side surface 142 of the fourth lens element 140 is Td, and they satisfy the relation: SD/Td=0.93.

Embodiment 2

Figure 2A:
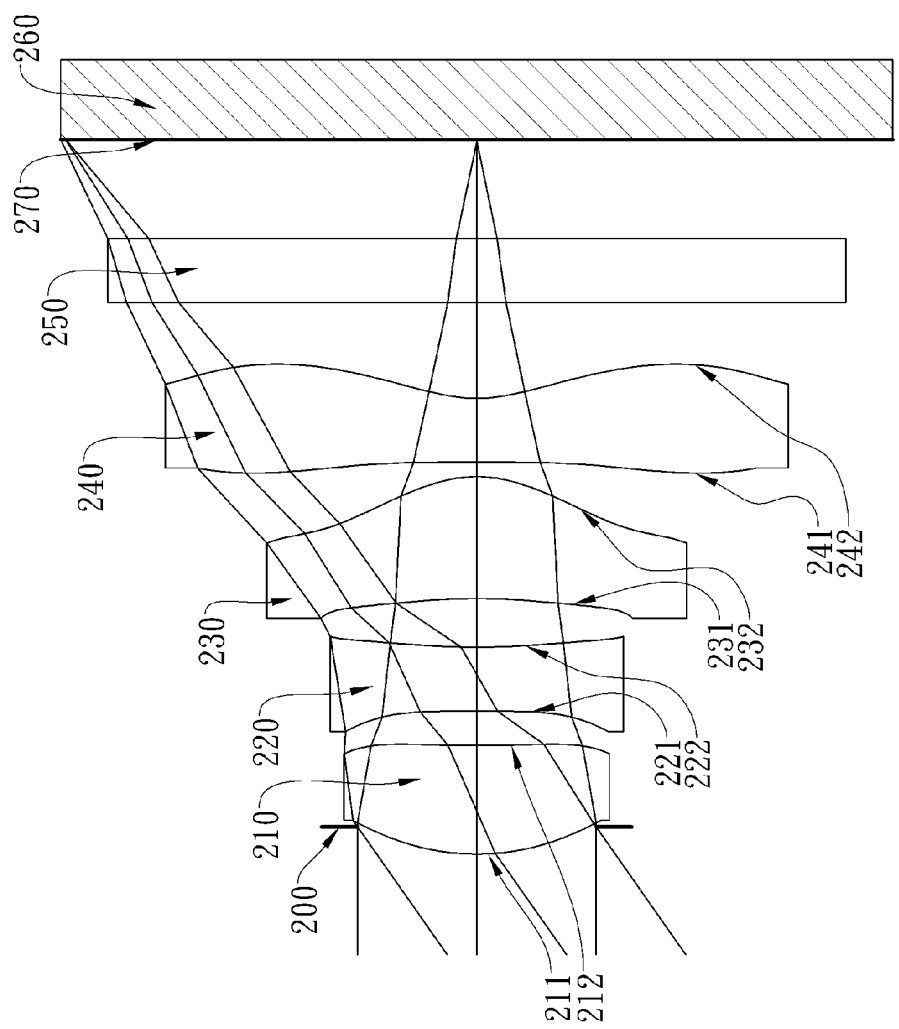
FIG. 2A shows an optical image capturing lens assembly in accordance with a second embodiment of the present invention.
Figure 2B:
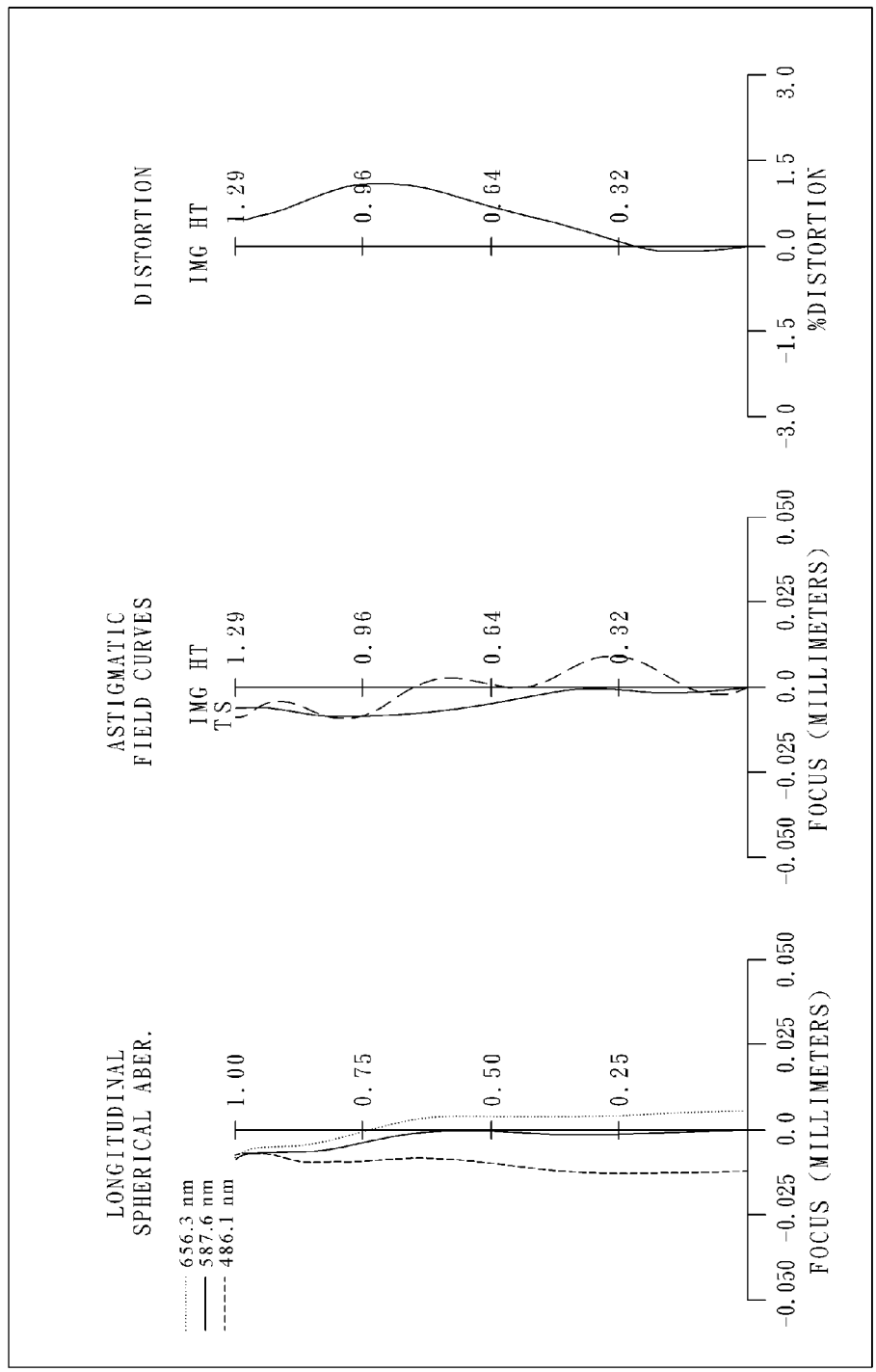
FIG. 2B shows the aberration curves of the second embodiment of the present invention.

FIG. 2A shows an optical image capturing lens assembly in accordance with a second embodiment of the present invention, and FIG. 2B shows the aberration curves of the second embodiment of the present invention. The optical image capturing lens assembly of the second embodiment of the present invention mainly comprises four lens elements, in order from an object side to an image side:

a plastic first lens element 210 with positive refractive power having a convex object-side surface 211 and a concave image-side surface 212, the object-side and image-side surfaces 211 and 212 thereof being aspheric;

a plastic second lens element 220 with negative refractive power having a concave object-side surface 221 and a concave image-side surface 222, the object-side and image-side surfaces 221 and 222 thereof being aspheric;

a plastic third lens element 230 with positive refractive power having a concave object-side surface 231 and a convex image-side surface 232, the object-side and image-side surfaces 231 and 232 thereof being aspheric; and a plastic fourth lens element 240 with negative refractive power having a concave object-side surface 241 and a concave image-side surface 242, the object-side and image-side surfaces 241 and 242 thereof being aspheric, at least one inflection point being formed on at least one of the object-side and image-side surfaces 241 and 242 thereof.

The optical image capturing lens assembly is also provided with a stop 200 disposed between an imaged object and the first lens element 210.

The optical image capturing lens assembly further comprises an IR-filter 250 disposed between the image-side surface 242 of the fourth lens element 240 and an image plane 261; the IR-filter 250 is made of glass and has no influence on the focal length of the optical image capturing lens assembly. Moreover, an image sensor 260 is disposed on the image plane 261.

The detailed optical data of the second embodiment is shown in TABLE 3, and the aspheric surface data is shown in TABLE 4, wherein the units of the curvature radius, the thickness and the focal length are expressed in mm, and HFOV is half of the maximal field of view.

TABLE 3

(Embodiment 2)
f = 1.83 mm, Fno = 2.45, HFOV = 35.0 deg.

| Surface # | | Curvature radius | Thickness | Material | Refractive Index | Abbe # | Focal Length |
|---|---|---|---|---|---|---|---|
| 0 | Object | Plano | Infinity | | | | |
| 1 | Stop | Plano | −0.085 | | | | |
| 2 | Lens 1 | 0.737600 (ASP) | 0.339 | Plastic | 1.544 | 55.9 | 1.65 |
| 3 | | 3.454800 (ASP) | 0.108 | | | | |
| 4 | Lens 2 | −40.000000 (ASP) | 0.200 | Plastic | 1.634 | 23.8 | −3.19 |
| 5 | | 2.131500 (ASP) | 0.152 | | | | |
| 6 | Lens 3 | −1.963650 (ASP) | 0.382 | Plastic | 1.544 | 55.9 | 0.80 |
| 7 | | −0.380610 (ASP) | 0.045 | | | | |
| 8 | Lens 4 | −89.285714 (ASP) | 0.200 | Plastic | 1.544 | 55.9 | −0.81 |
| 9 | | 0.442332 (ASP) | 0.300 | | | | |
| 10 | IR-filter | Plano | 0.200 | Glass | 1.516 | 64.1 | — |
| 11 | | Plano | 0.309 | | | | |
| 12 | Image Plane | Plano | — | | | | |

* Reference Wavelength is d-line 587.6 nm

TABLE 4

Aspheric Coefficients

| Surface # | 2 | 3 | 4 | 5 |
|---|---|---|---|---|
| k = | −4.21401E−01 | −7.20801E+01 | 1.00000E+00 | 1.56204E+01 |
| A4 = | 1.40093E−01 | −7.28454E−01 | −1.95851E+00 | −7.43681E−01 |
| A6 = | −1.69183E+00 | −4.37255E+00 | −3.25869E+00 | −2.53624E+00 |
| A8 = | 1.63735E+01 | −2.27535E−01 | −1.95248E+01 | 1.20808E+01 |
| A10 = | −8.41605E+01 | −1.31259E+01 | 2.78330E+02 | |
| A12 = | | | −5.42223E+02 | |

| Surface # | 6 | 7 | 8 | 9 |
|---|---|---|---|---|
| k = | 1.47558E+01 | −4.03453E+00 | 1.00000E+00 | −7.99008E+00 |
| A4 = | 7.59983E−01 | −5.98845E−01 | −7.45617E−01 | −1.02207E+00 |
| A6 = | 6.15507E−01 | 2.91641E+00 | 2.44634E+00 | 2.87904E+00 |
| A8 = | 2.84050E+01 | 1.39758E+01 | −4.27448E+00 | −6.60847E+00 |
| A10 = | −3.71676E+02 | −4.95360E+01 | 6.21852E+00 | 1.01685E+01 |
| A12 = | 1.76390E+03 | −2.37767E+01 | −7.00715E+00 | −9.97783E+00 |
| A14 = | −3.85025E+03 | 2.00428E+02 | 4.72589E+00 | 5.65782E+00 |
| A16 = | 2.82114E+03 | −1.73128E+02 | −1.35080E+00 | −1.37835E+00 |

The equation of the aspheric surface profiles of the second embodiment has the same form as that of the first embodiment. Moreover, the definitions of the parameters of the relations are the same as those set forth in the first embodiment, but the values of the relations of the second embodiment are listed in TABLE 5 below:

TABLE 5

(Embodiment 2)

| | |
|---|---|
| f | 1.83 |
| FNO | 2.45 |
| HFOV | 35.0 |
| V1 − V2 | 32.1 |
| CTmax [mm] | 0.38 |
| CTmin [mm] | 0.20 |
| CT2 + CT4 [mm] | 0.400 |
| Td [mm] | 1.43 |
| (R1 + R2)/(R1 − R2) | −1.54 |
| |f/R7| | 0.02 |
| f3/f | 0.44 |
| f4/f | −0.44 |
| SD/Td | 0.94 |

Embodiment 3

Figure 3A:
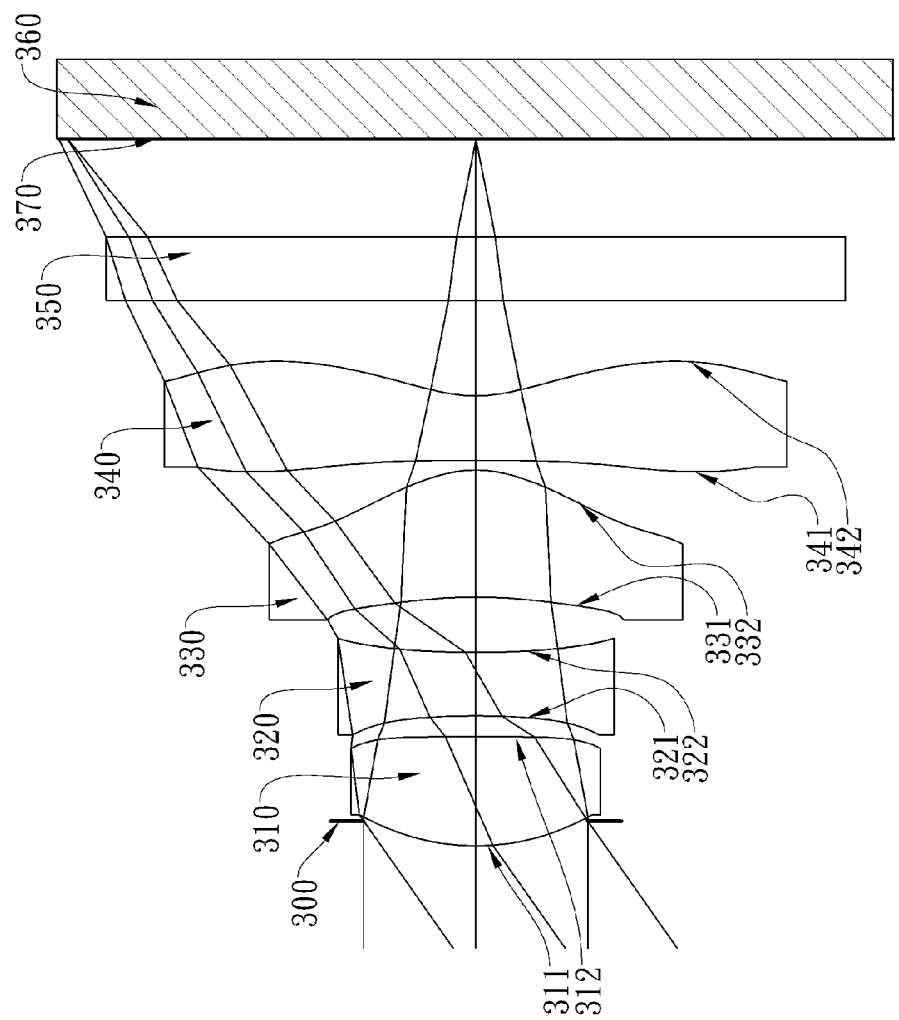
FIG. 3A shows an optical image capturing lens assembly in accordance with a third embodiment of the present invention.
Figure 3B:
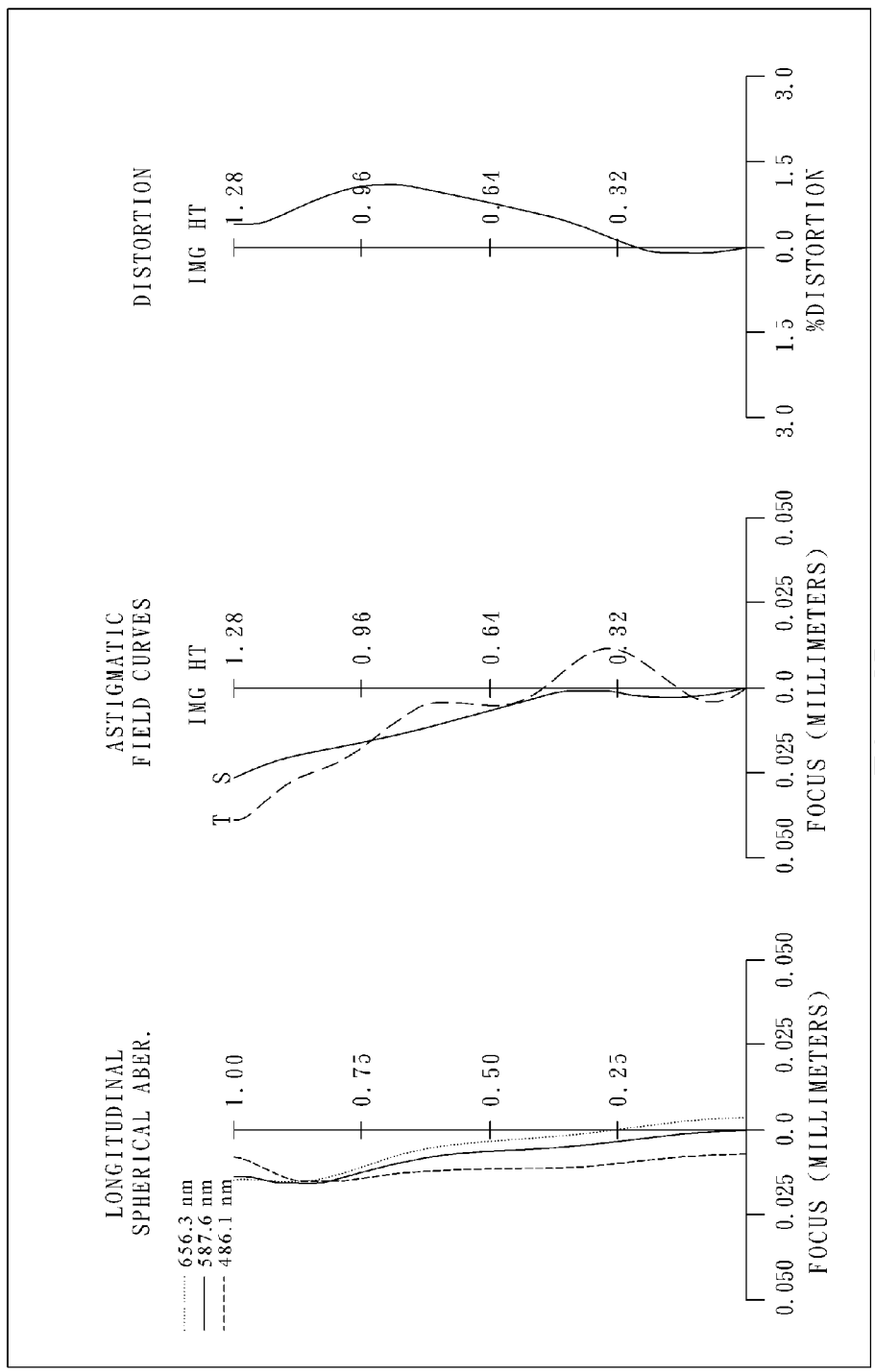
FIG. 3B shows the aberration curves of the third embodiment of the present invention.

FIG. 3A shows an optical image capturing lens assembly in accordance with a third embodiment of the present invention, and FIG. 3B shows the aberration curves of the third embodiment of the present invention. The optical image capturing lens assembly of the third embodiment of the present invention mainly comprises four lens elements, in order from an object side to an image side:

a plastic first lens element 310 with positive refractive power having a convex object-side surface 311 and a convex image-side surface 312, the object-side and image-side surfaces 311 and 312 thereof being aspheric;

a plastic second lens element 320 with negative refractive power having a concave object-side surface 321 and a concave image-side surface 322, the object-side and image-side surfaces 321 and 322 thereof being aspheric;

a plastic third lens element 330 with positive refractive power having a concave object-side surface 331 and a convex image-side surface 332, the object-side and image-side surfaces 331 and 332 thereof being aspheric; and a plastic fourth lens element 340 with negative refractive power having a concave object-side surface 341 and a concave image-side surface 342, the object-side and image-side surfaces 341 and 342 thereof being aspheric, at least one inflection point being formed on at least one of the object-side and image-side surfaces 341 and 342 thereof.

The optical image capturing lens assembly is also provided with a stop 300 disposed between an imaged object and the first lens element 310.

The optical image capturing lens assembly further comprises an IR-filter 350 disposed between the image-side surface 342 of the fourth lens element 340 and an image plane 361; the IR-filter 350 is made of glass and has no influence on the focal length of the optical image capturing lens assembly. Moreover, an image sensor 360 is disposed on the image plane 361.

The detailed optical data of the third embodiment is shown in TABLE 6, and the aspheric surface data is shown in TABLE 7, wherein the units of the curvature radius, the thickness and the focal length are expressed in mm, and HFOV is half of the maximal field of view.

TABLE 6

(Embodiment 3)
f = 1.83 mm, Fno = 2.60, HFOV = 35.1 deg.

| Surface # | | Curvature radius | Thickness | Material | Refractive Index | Abbe # | Focal Length |
|---|---|---|---|---|---|---|---|
| 0 | Object | Plano | Infinity | | | | |
| 1 | Stop | Plano | −0.078 | | | | |
| 2 | Lens 1 | 0.724630 (ASP) | 0.343 | Plastic | 1.544 | 55.9 | 1.32 |
| 3 | | −100.000000 (ASP) | 0.066 | | | | |
| 4 | Lens 2 | −2.569260 (ASP) | 0.200 | Plastic | 1.634 | 23.8 | −2.29 |
| 5 | | 3.434600 (ASP) | 0.174 | | | | |
| 6 | Lens 3 | −1.614980 (ASP) | 0.400 | Plastic | 1.544 | 55.9 | 0.79 |
| 7 | | −0.370540 (ASP) | 0.030 | | | | |
| 8 | Lens 4 | −57.933600 (ASP) | 0.204 | Plastic | 1.544 | 55.9 | −0.78 |
| 9 | | 0.428800 (ASP) | 0.300 | | | | |
| 10 | IR-filter | Plano | 0.200 | Glass | 1.516 | 64.1 | — |
| 11 | | Plano | 0.309 | | | | |
| 12 | Image Plane | Plano | — | | | | |

\* Reference Wavelength is d-line 587.6 nm

TABLE 7

Aspheric Coefficients

| Surface # | 2 | 3 | 4 | 5 |
|---|---|---|---|---|
| k = | −3.70606E−01 | 5.00000E+01 | −8.55572E+01 | 4.57407E+01 |
| A4 = | 2.19841E−01 | −3.38780E−01 | −9.26431E−01 | 5.99411E−01 |
| A6 = | −1.86193E+00 | −6.06126E+00 | −3.84226E+00 | −3.80880E+00 |
| A8 = | 2.26117E+01 | −2.60398E+00 | −2.84407E+01 | 9.70473E+00 |
| A10 = | −1.21274E+02 | −4.85774E+01 | 1.88018E+02 | |
| A12 = | | | −3.98092E+02 | |

| Surface # | 6 | 7 | 8 | 9 |
|---|---|---|---|---|
| k = | 1.06390E+01 | −4.02058E+00 | 1.00000E+00 | −8.00044E+00 |
| A4 = | 6.43464E−01 | −5.89641E−01 | −7.45617E−01 | −1.02207E+00 |
| A6 = | 1.36802E+00 | 1.47079E+00 | 2.44634E+00 | 2.87904E+00 |
| A8 = | 3.25201E+01 | 1.66711E+01 | −4.27448E+00 | −6.60847E+00 |
| A10 = | −3.82892E+02 | −4.57400E+01 | 6.21852E+00 | 1.01685E+01 |
| A12 = | 1.69810E+03 | −2.93148E+01 | −7.00715E+00 | −9.97783E+00 |
| A14 = | −3.50412E+03 | 1.80996E+02 | 4.72589E+00 | 5.65782E+00 |
| A16 = | 2.67828E+03 | −1.48883E+02 | −1.35080E+00 | −1.37835E+00 |

The equation of the aspheric surface profiles of the third embodiment has the same form as that of the first embodiment. Moreover, the definitions of the parameters of the relations are the same as those set forth in the first embodiment, but the values of the relations of the third embodiment are listed in TABLE 8 below:

TABLE 8

(Embodiment 3)

| | |
|---|---|
| f | 1.83 |
| FNO | 2.60 |
| HFOV | 35.1 |
| V1 − V2 | 32.1 |
| CTmax [mm] | 0.40 |
| CTmin [mm] | 0.20 |
| CT2 + CT4 [mm] | 0.404 |
| Td [mm] | 1.42 |
| (R1 + R2)/(R1 − R2) | −0.99 |
| \|f/R7\| | 0.03 |
| f3/f | 0.43 |
| f4/f | −0.43 |
| SD/Td | 0.95 |

Embodiment 4

Figure 4A:
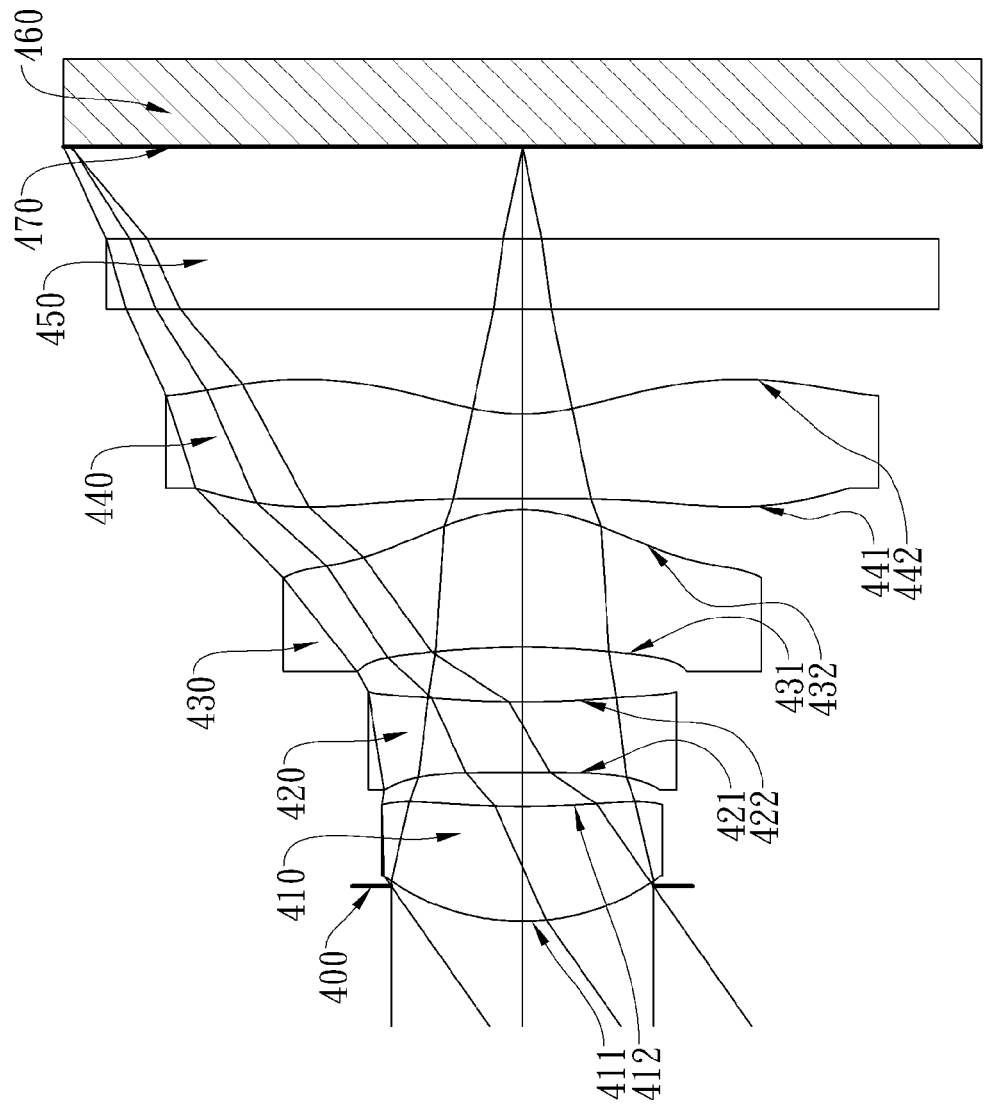
FIG. 4A shows an optical image capturing lens assembly in accordance with a fourth embodiment of the present invention.
Figure 4B:
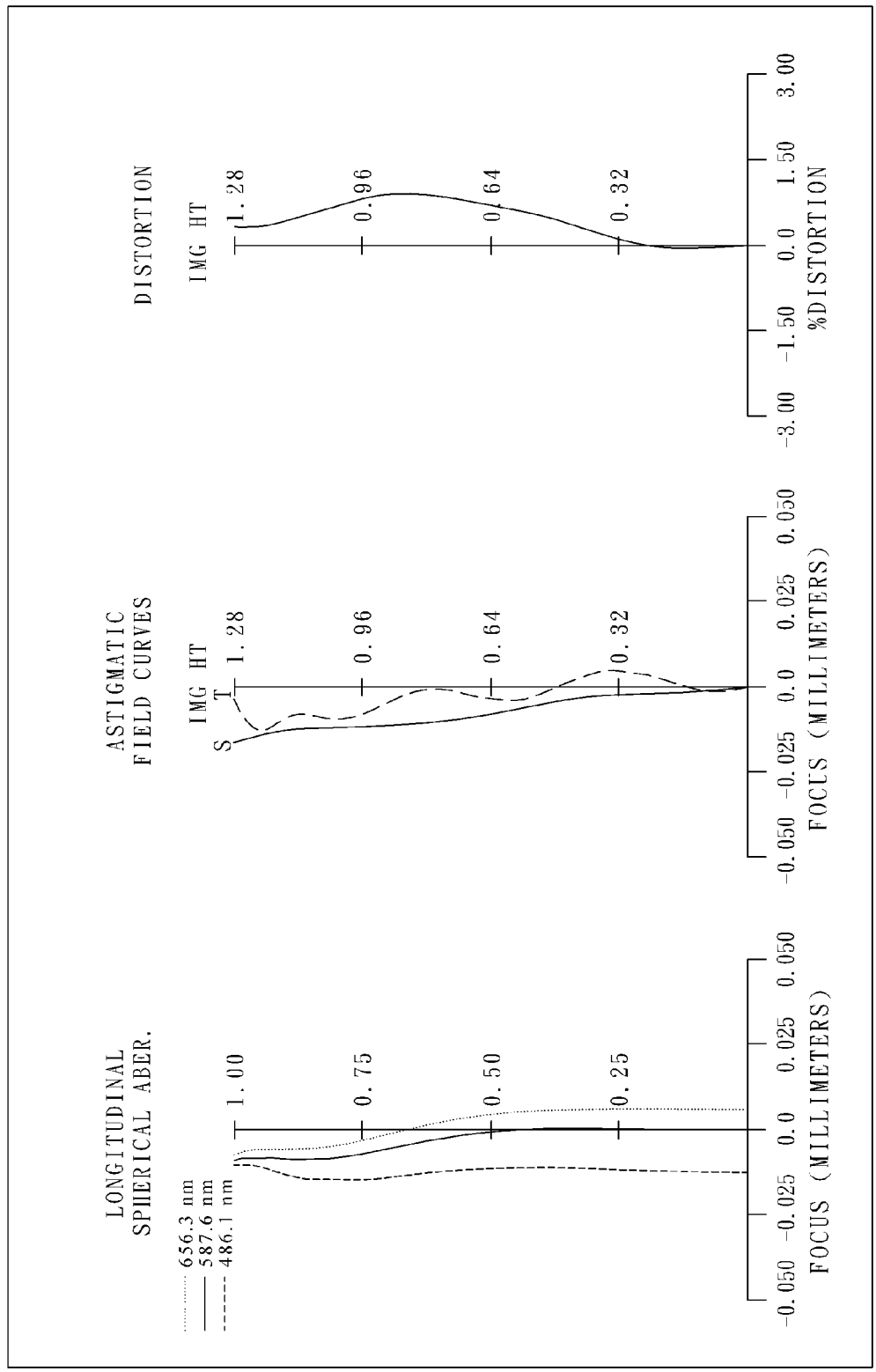
FIG. 4B shows the aberration curves of the fourth embodiment of the present invention.

FIG. 4A shows an optical image capturing lens assembly in accordance with a fourth embodiment of the present invention, and FIG. 4B shows the aberration curves of the fourth embodiment of the present invention. The optical image capturing lens assembly of the fourth embodiment of the present invention mainly comprises four lens elements, in order from an object side to an image side:

a plastic first lens element 410 with positive refractive power having a convex object-side surface 411 and a concave image-side surface 412, the object-side and image-side surfaces 411 and 412 thereof being aspheric;

a plastic second lens element 420 with negative refractive power having a concave object-side surface 421 and a concave image-side surface 422, the object-side and image-side surfaces 421 and 422 thereof being aspheric;

a plastic third lens element 430 with positive refractive power having a concave object-side surface 431 and a convex image-side surface 432, the object-side and image-side surfaces 431 and 432 thereof being aspheric; and a plastic fourth lens element 440 with negative refractive power having a convex object-side surface 441 and a concave image-side surface 442, the object-side and image-side surfaces 441 and 442 thereof being aspheric, at least one inflection point being formed on at least one of the object-side and image-side surfaces 441 and 442 thereof.

The optical image capturing lens assembly is also provided with a stop 400 disposed between an imaged object and the first lens element 410.

The optical image capturing lens assembly further comprises an IR-filter 450 disposed between the image-side surface 442 of the fourth lens element 440 and an image plane 461; the IR-filter 450 is made of glass and has no influence on the focal length of the optical image capturing lens assembly. Moreover, an image sensor 460 is disposed on the image plane 461.

The detailed optical data of the fourth embodiment is shown in TABLE 9, and the aspheric surface data is shown in TABLE 10, wherein the units of the curvature radius, the thickness and the focal length are expressed in mm, and HFOV is half of the maximal field of view.

TABLE 9

(Embodiment 4)
f = 1.83 mm, Fno = 2.45, HFOV = 35.0 deg.

| Surface # | | Curvature radius | Thickness | Material | Refractive Index | Abbe # | Focal Length |
|---|---|---|---|---|---|---|---|
| 0 | Object | Plano | Infinity | | | | |
| 1 | Stop | Plano | −0.100 | | | | |
| 2 | Lens 1 | 0.675560 (ASP) | 0.327 | Plastic | 1.544 | 55.9 | 1.62 |
| 3 | | 2.392150 (ASP) | 0.098 | | | | |
| 4 | Lens 2 | −40.000000 (ASP) | 0.200 | Plastic | 1.634 | 23.8 | −3.60 |
| 5 | | 2.424540 (ASP) | 0.157 | | | | |
| 6 | Lens 3 | −2.067850 (ASP) | 0.394 | Plastic | 1.544 | 55.9 | 0.94 |
| 7 | | −0.436344 (ASP) | 0.030 | | | | |
| 8 | Lens 4 | 100.000000 (ASP) | 0.241 | Plastic | 1.544 | 55.9 | −0.93 |
| 9 | | 0.501640 (ASP) | 0.300 | | | | |
| 10 | IR-filter | Plano | 0.200 | Glass | 1.516 | 64.1 | — |
| 11 | | Plano | 0.265 | | | | |
| 12 | Image Plane | Plano | — | | | | |

* Reference Wavelength is d-line 587.6 nm

TABLE 10

Aspheric Coefficients

| Surface # | 2 | 3 | 4 | 5 |
|---|---|---|---|---|
| k = | −1.95359E−01 | 1.00000E+00 | 1.00000E+00 | 2.62318E+01 |
| A4 = | 1.74463E−01 | −3.41721E−01 | −1.39292E+00 | −5.36433E−01 |
| A6 = | −3.66100E−01 | −5.34234E+00 | −4.02621E+00 | −3.11531E+00 |
| A8 = | 9.21362E+00 | 3.33862E+01 | −8.11548E+00 | 9.04273E+00 |
| A10 = | −3.49369E+01 | −1.90221E+02 | 1.85191E+02 | |
| A12 = | | | −8.50386E+02 | |

TABLE 10-continued

| Aspheric Coefficients | | | | |
|---|---|---|---|---|
| Surface # | 6 | 7 | 8 | 9 |
| k = | 1.78303E+01 | −4.42633E+00 | −9.00000E+01 | −8.48348E+00 |
| A4 = | 8.80750E−01 | −3.06712E−01 | −7.00131E−01 | −8.63003E−01 |
| A6 = | −1.94771E+00 | 2.01491E+00 | 1.43114E+00 | 1.82291E+00 |
| A8 = | 3.19953E+01 | 1.10894E+01 | 2.13089E+00 | −2.97113E+00 |
| A10 = | −3.52837E+02 | −3.08732E+01 | −9.74126E+00 | 2.87938E+00 |
| A12 = | 1.70484E+03 | −6.76515E+01 | 1.27912E+01 | −1.33135E+00 |
| A14 = | −4.09604E+03 | 2.62655E+02 | −7.60949E+00 | 2.06728E−01 |
| A16 = | 3.03122E+03 | −2.13684E+02 | 1.74260E+00 | 6.53368E−03 |

The equation of the aspheric surface profiles of the fourth embodiment has the same form as that of the first embodiment. Moreover, the definitions of the parameters of the relations are the same as those set forth in the first embodiment, but the values of the relations of the fourth embodiment are listed in TABLE 11 below:

TABLE 11

| (Embodiment 4) | |
|---|---|
| f | 1.83 |
| FNO | 2.45 |
| HFOV | 35.0 |
| V1 − V2 | 32.1 |
| CTmax [mm] | 0.39 |
| CTmin [mm] | 0.20 |
| CT2 + CT4 [mm] | 0.441 |
| Td [mm] | 1.45 |
| (R1 + R2)/(R1 − R2) | −1.79 |
| |f/R7| | 0.02 |
| f3/f | 0.51 |
| f4/f | −0.51 |
| SD/Td | 0.93 |

Embodiment 5

Figure 5A:
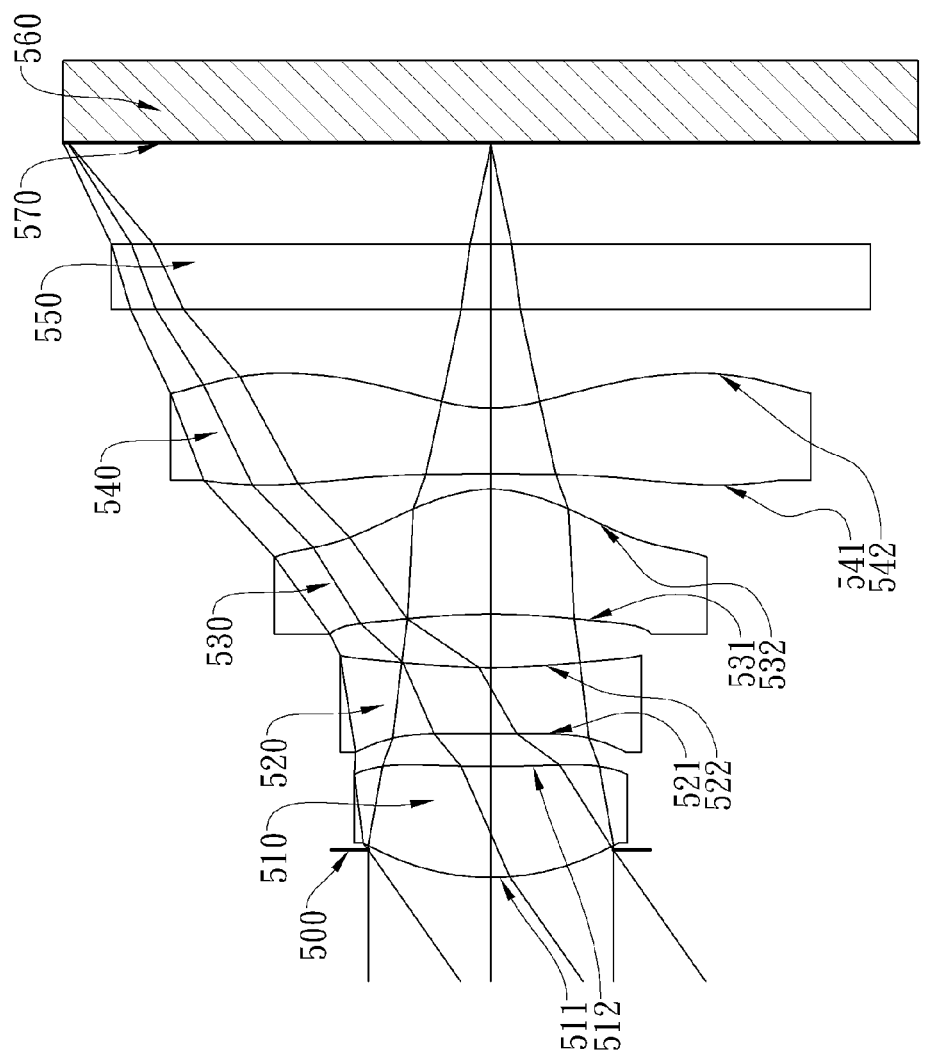
FIG. 5A shows an optical image capturing lens assembly in accordance with a fifth embodiment of the present invention.
Figure 5B:
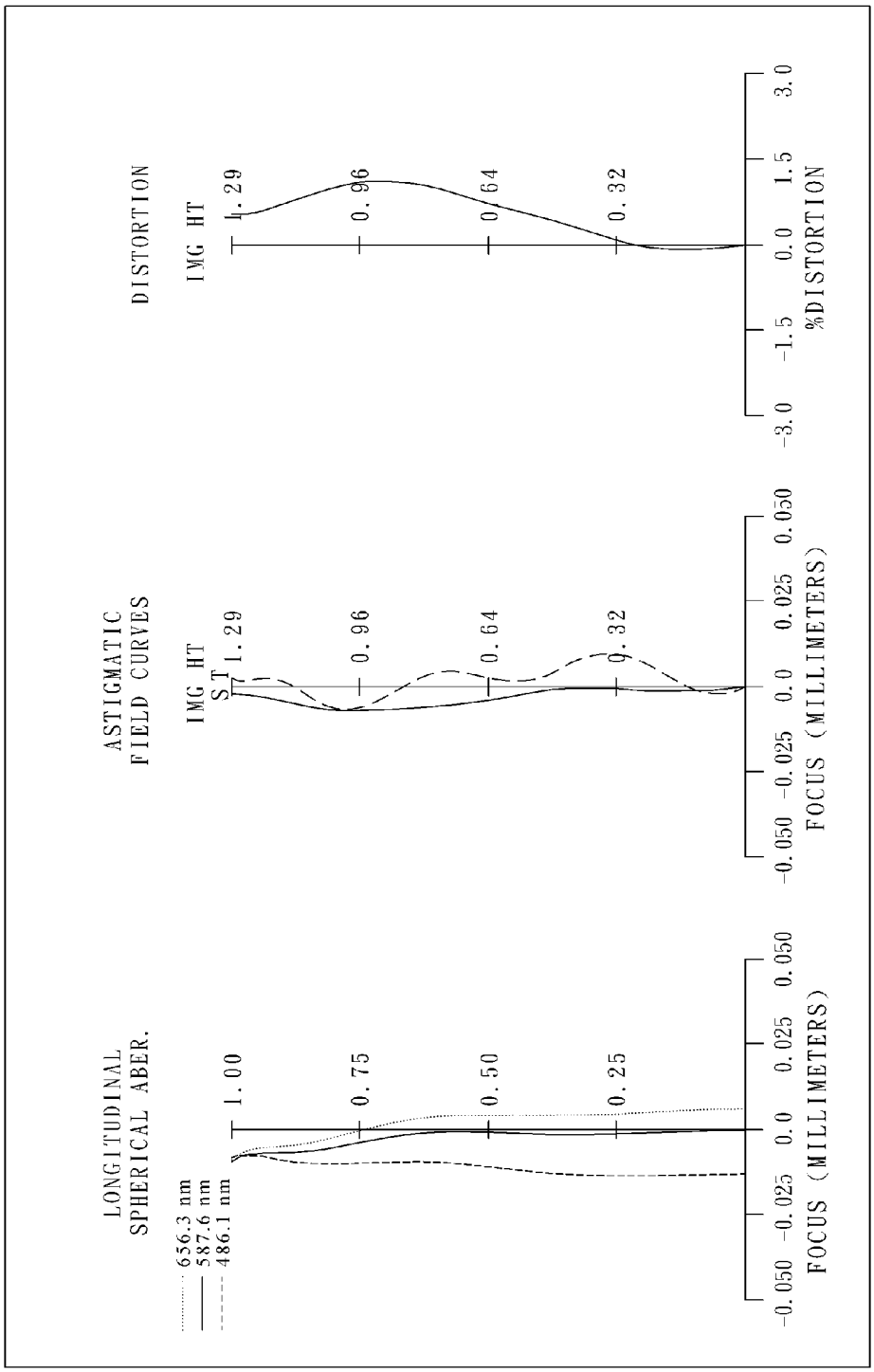
FIG. 5B shows the aberration curves of the fifth embodiment of the present invention.

FIG. 5A shows an optical image capturing lens assembly in accordance with a fifth embodiment of the present invention, and FIG. 5B shows the aberration curves of the fifth embodiment of the present invention. The optical image capturing lens assembly of the fifth embodiment of the present invention mainly comprises four lens elements, in order from an object side to an image side:

a plastic first lens element 510 with positive refractive power having a convex object-side surface 511 and a concave image-side surface 512, the object-side and image-side surfaces 511 and 512 thereof being aspheric;

a plastic second lens element 520 with negative refractive power having a convex object-side surface 521 and a concave image-side surface 522, the object-side and image-side surfaces 521 and 522 thereof being aspheric;

a plastic third lens element 530 with positive refractive power having a concave object-side surface 531 and a convex image-side surface 532, the object-side and image-side surfaces 531 and 532 thereof being aspheric; and a plastic fourth lens element 540 with negative refractive power having a concave object-side surface 541 and a concave image-side surface 542, the object-side and image-side surfaces 541 and 542 thereof being aspheric, at least one inflection point being formed on at least one of the object-side and image-side surfaces 541 and 542 thereof.

The optical image capturing lens assembly is also provided with a stop 500 disposed between an imaged object and the first lens element 510.

The optical image capturing lens assembly further comprises an IR-filter 550 disposed between the image-side surface 542 of the fourth lens element 540 and an image plane 561; the IR-filter 550 is made of glass and has no influence on the focal length of the optical image capturing lens assembly. Moreover, an image sensor 560 is disposed on the image plane 561.

The detailed optical data of the fifth embodiment is shown in TABLE 12, and the aspheric surface data is shown in TABLE 13, wherein the units of the curvature radius, the thickness and the focal length are expressed in mm, and HFOV is half of the maximal field of view.

TABLE 12

(Embodiment 5)
f = 1.83 mm, Fno = 2.45, HFOV = 35.0 deg.

| Surface # | | Curvature radius | Thickness | Material | Refractive Index | Abbe # | Focal Length |
|---|---|---|---|---|---|---|---|
| 0 | Object | Plano | Infinity | | | | |
| 1 | Stop | Plano | −0.084 | | | | |
| 2 | Lens 1 | 0.739890 (ASP) | 0.337 | Plastic | 1.544 | 55.9 | 1.72 |
| 3 | | 2.935340 (ASP) | 0.101 | | | | |
| 4 | Lens 2 | 9.783500 (ASP) | 0.200 | Plastic | 1.634 | 23.8 | −3.56 |
| 5 | | 1.820680 (ASP) | 0.163 | | | | |
| 6 | Lens 3 | −1.981920 (ASP) | 0.380 | Plastic | 1.544 | 55.9 | 0.81 |
| 7 | | −0.383050 (ASP) | 0.046 | | | | |
| 8 | Lens 4 | −89.285700 (ASP) | 0.200 | Plastic | 1.544 | 55.9 | −0.81 |
| 9 | | 0.446030 (ASP) | 0.300 | | | | |
| 10 | IR-filter | Plano | 0.200 | Glass | 1.516 | 64.1 | — |
| 11 | | Plano | 0.307 | | | | |
| 12 | Image Plane | Plano | — | | | | |

* Reference Wavelength is d-line 587.6 nm

TABLE 13

Aspheric Coefficients

| Surface # | 2 | 3 | 4 | 5 |
|---|---|---|---|---|
| k = | −5.11975E−01 | −6.55708E+01 | −9.00000E+01 | 1.07570E+01 |
| A4 = | 1.60088E−01 | −7.44096E−01 | −2.07804E+00 | −8.82212E−01 |
| A6 = | −1.54921E+00 | −4.54269E+00 | −3.28396E+00 | −2.47658E+00 |
| A8 = | 1.54961E+01 | −5.06354E−01 | −2.19550E+01 | 1.21935E+01 |
| A10 = | −7.99874E+01 | −7.25005E+00 | 2.92651E+02 | |
| A12 = | | | −5.50671E+02 | |

| Surface # | 6 | 7 | 8 | 9 |
|---|---|---|---|---|
| k = | 1.49162E+01 | −4.02870E+00 | −9.00000E+01 | −7.98775E+00 |
| A4 = | 7.02450E−01 | −5.96867E−01 | −7.45617E−01 | −1.02207E+00 |
| A6 = | 1.02350E+00 | 2.93136E+00 | 2.44634E+00 | 2.87904E+00 |
| A8 = | 2.74174E+01 | 1.40309E+01 | −4.27448E+00 | −6.60847E+00 |
| A10 = | −3.72519E+02 | −4.96786E+01 | 6.21852E+00 | 1.01685E+01 |
| A12 = | 1.77589E+03 | −2.39530E+01 | −7.00715E+00 | −9.97783E+00 |
| A14 = | −3.87694E+03 | 2.00729E+02 | 4.72589E+00 | 5.65782E+00 |
| A16 = | 2.82140E+03 | −1.72774E+02 | −1.35080E+00 | −1.37835E+00 |

The equation of the aspheric surface profiles of the fifth embodiment has the same form as that of the first embodiment. Moreover, the definitions of the parameters of the relations are the same as those set forth in the first embodiment, but the values of the relations of the fifth embodiment are listed in TABLE 14 below:

TABLE 14

(Embodiment 5)

| | |
|---|---|
| f | 1.83 |
| FNO | 2.45 |
| HFOV | 35.0 |
| V1 − V2 | 32.1 |
| CTmax [mm] | 0.38 |
| CTmin [mm] | 0.20 |
| CT2 + CT4 [mm] | 0.400 |
| Td [mm] | 1.43 |
| (R1 + R2)/(R1 − R2) | −1.67 |
| |f/R7| | 0.02 |
| f3/f | 0.44 |
| f4/f | −0.45 |
| SD/Td | 0.94 |

Embodiment 6

Figure 6A:
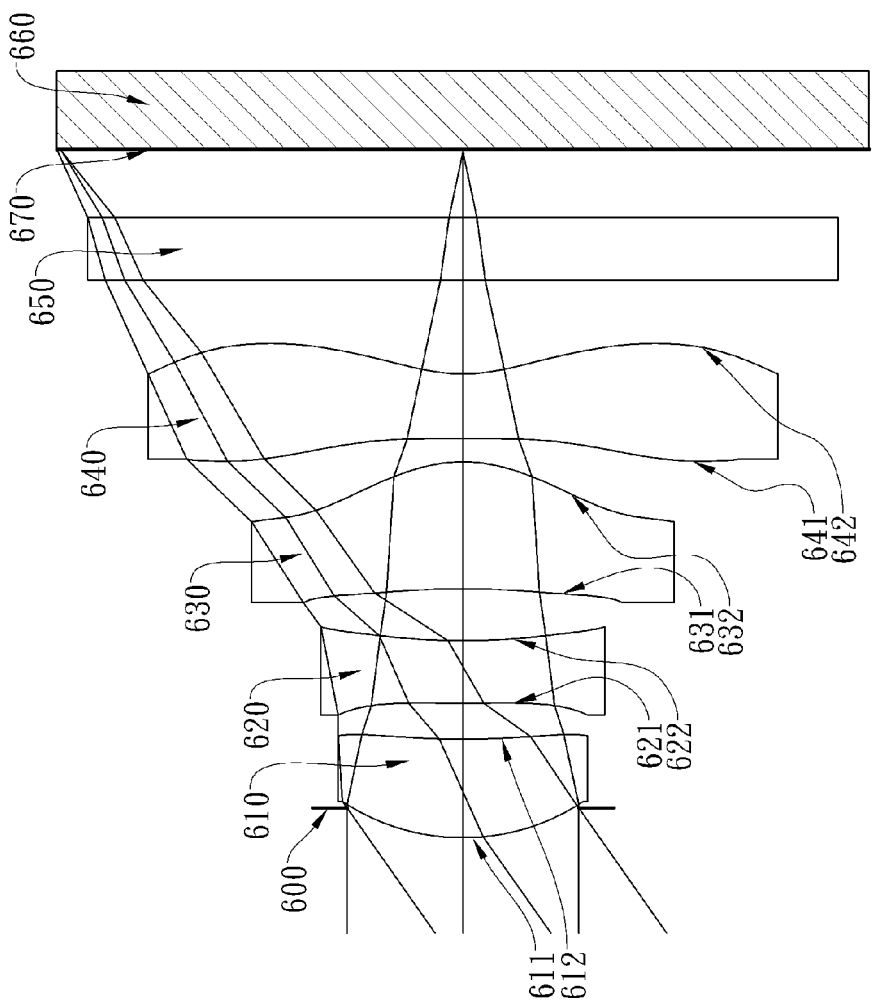
FIG. 6A shows an optical image capturing lens assembly in accordance with a sixth embodiment of the present invention.
Figure 6B:
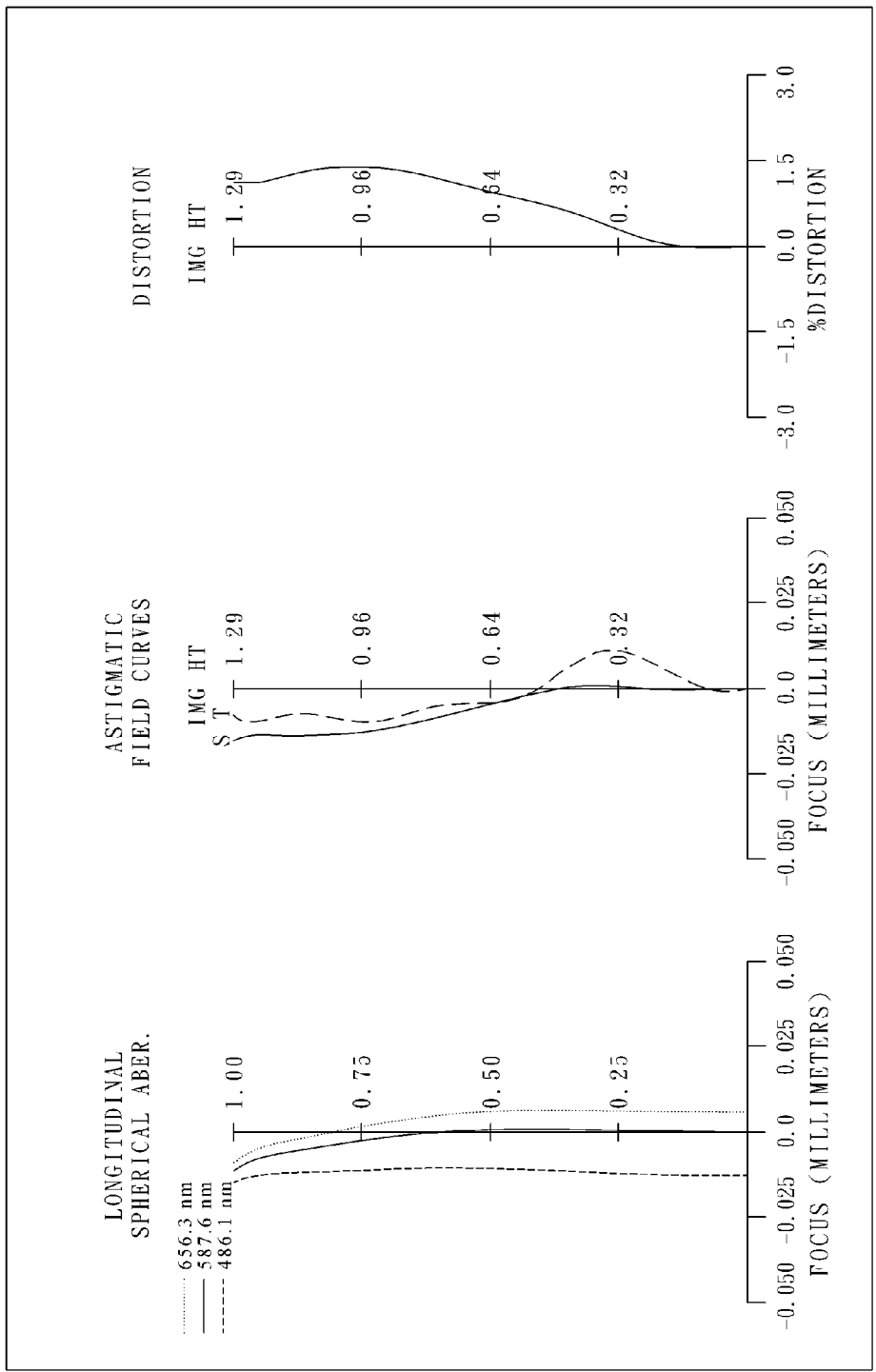
FIG. 6B shows the aberration curves of the sixth embodiment of the present invention.

FIG. 6A shows an optical image capturing lens assembly in accordance with a sixth embodiment of the present invention, and FIG. 6B shows the aberration curves of the sixth embodiment of the present invention. The optical image capturing lens assembly of the sixth embodiment of the present invention mainly comprises four lens elements, in order from an object side to an image side:

a plastic first lens element 610 with positive refractive power having a convex object-side surface 611 and a concave image-side surface 612, the object-side and image-side surfaces 611 and 612 thereof being aspheric;

a plastic second lens element 620 with negative refractive power having a convex object-side surface 621 and a concave image-side surface 622, the object-side and image-side surfaces 621 and 622 thereof being aspheric;

a plastic third lens element 630 with positive refractive power having a concave object-side surface 631 and a convex image-side surface 632, the object-side and image-side surfaces 631 and 632 thereof being aspheric; and a plastic fourth lens element 640 with negative refractive power having a convex object-side surface 641 and a concave image-side surface 642, the object-side and image-side surfaces 641 and 642 thereof being aspheric, at least one inflection point being formed on at least one of the object-side and image-side surfaces 641 and 642 thereof.

The optical image capturing lens assembly is also provided with a stop 600 disposed between an imaged object and the first lens element 610.

The optical image capturing lens assembly further comprises an IR-filter 650 disposed between the image-side surface 642 of the fourth lens element 640 and an image plane 661; the IR-filter 650 is made of glass and has no influence on the focal length of the optical image capturing lens assembly. Moreover, an image sensor 660 is disposed on the image plane 661.

The detailed optical data of the sixth embodiment is shown in TABLE 15, and the aspheric surface data is shown in TABLE 16, wherein the units of the curvature radius, the thickness and the focal length are expressed in mm, and HFOV is half of the maximal field of view.

TABLE 15

(Embodiment 6)
f = 1.81 mm, Fno = 2.45, HFOV = 35.1 deg.

| Surface # | | Curvature radius | Thickness | Material | Refractive Index | Abbe # | Focal Length |
|---|---|---|---|---|---|---|---|
| 0 | Object | Plano | Infinity | | | | |
| 1 | Stop | Plano | −0.095 | | | | |
| 2 | Lens 1 | 0.700850 (ASP) | 0.315 | Plastic | 1.544 | 55.9 | 1.69 |
| 3 | | 2.491530 (ASP) | 0.115 | | | | |
| 4 | Lens 2 | 11.125300 (ASP) | 0.200 | Plastic | 1.640 | 23.3 | −3.75 |
| 5 | | 1.957870 (ASP) | 0.166 | | | | |

TABLE 15-continued (Embodiment 6)
f = 1.81 mm, Fno = 2.45, HFOV = 35.1 deg.

| Surface # | | Curvature radius | Thickness | Material | Refractive Index | Abbe # | Focal Length |
|---|---|---|---|---|---|---|---|
| 6 | Lens 3 | −2.504350 (ASP) | 0.406 | Plastic | 1.544 | 55.9 | 0.97 |
| 7 | | −0.461880 (ASP) | 0.074 | | | | |
| 8 | Lens 4 | 17.924917 (ASP) | 0.207 | Plastic | 1.544 | 55.9 | −0.95 |
| 9 | | 0.501834 (ASP) | 0.300 | | | | |
| 10 | IR-filter | Plano | 0.200 | Glass | 1.516 | 64.1 | — |
| 11 | | Plano | 0.218 | | | | |
| 12 | Image Plane | Plano | — | | | | |

* Reference Wavelength is d-line 587.6 nm

TABLE 16

Aspheric Coefficients

| Surface # | 2 | 3 | 4 | 5 |
|---|---|---|---|---|
| k = | −2.91588E−01 | −1.63400E+01 | −5.85214E+01 | 1.50392E+01 |
| A4 = | 1.62026E−01 | −1.38931E−01 | −1.11385E+00 | −4.63535E−01 |
| A6 = | −7.86714E−02 | −4.54431E+00 | −6.32772E+00 | −2.77733E+00 |
| A8 = | 5.93442E+00 | 2.79725E+01 | 2.33079E+01 | 7.00915E+00 |
| A10 = | −2.76003E+01 | −1.42257E+02 | −1.46006E+01 | |
| A12 = | | | −2.93278E+02 | |

| Surface # | 6 | 7 | 8 | 9 |
|---|---|---|---|---|
| k = | 1.32059E+01 | −4.02199E+00 | −9.00000E+01 | −7.55064E+00 |
| A4 = | 4.85049E−01 | −7.47856E−01 | −2.11213E+00 | −1.24877E+00 |
| A6 = | −7.88033E−01 | 2.09657E+00 | 9.02075E+00 | 3.81180E+00 |
| A8 = | 3.83175E+01 | 1.72590E+01 | −2.11917E+01 | −8.55263E+00 |
| A10 = | −3.84379E+02 | −4.76548E+01 | 3.22501E+01 | 1.26133E+01 |
| A12 = | 1.69850E+03 | −2.89217E+01 | −3.09301E+01 | −1.17897E+01 |
| A14 = | −3.84837E+03 | 1.84516E+02 | 1.68441E+01 | 6.24986E+00 |
| A16 = | 3.17423E+03 | −1.46483E+02 | −3.95848E+00 | −1.40279E+00 |

The equation of the aspheric surface profiles of the sixth embodiment has the same form as that of the first embodiment. Moreover, the definitions of the parameters of the relations are the same as those set forth in the first embodiment, but the values of the relations of the sixth embodiment are listed in TABLE 17 below:

TABLE 17

(Embodiment 6)

| | |
|---|---|
| f | 1.81 |
| FNO | 2.45 |
| HFOV | 35.1 |
| V1 − V2 | 32.6 |
| CTmax [mm] | 0.41 |
| CTmin [mm] | 0.20 |
| CT2 + CT4 [mm] | 0.407 |
| Td [mm] | 1.48 |
| (R1 + R2)/(R1 − R2) | −1.78 |
| |f/R7| | 0.10 |
| f3/f | 0.54 |
| f4/f | −0.53 |
| SD/Td | 0.94 |

Embodiment 7

Figure 7A:
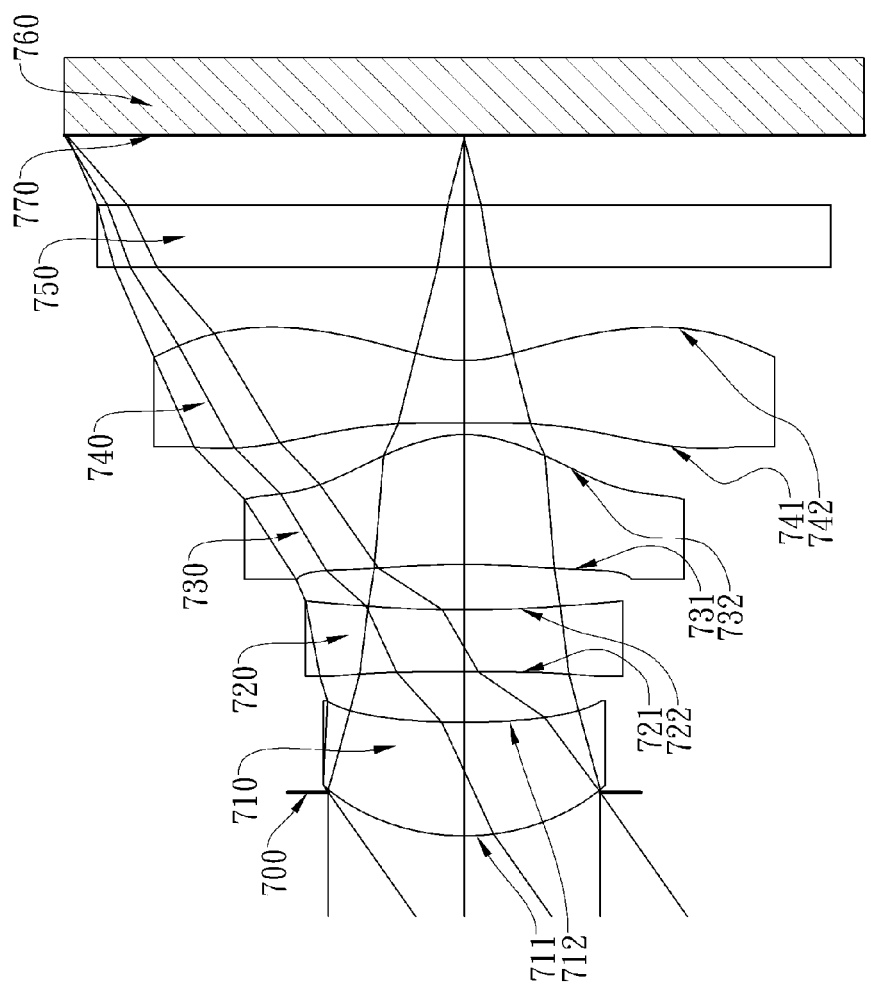
FIG. 7A shows an optical image capturing lens assembly in accordance with a seventh embodiment of the present invention.
Figure 7B:
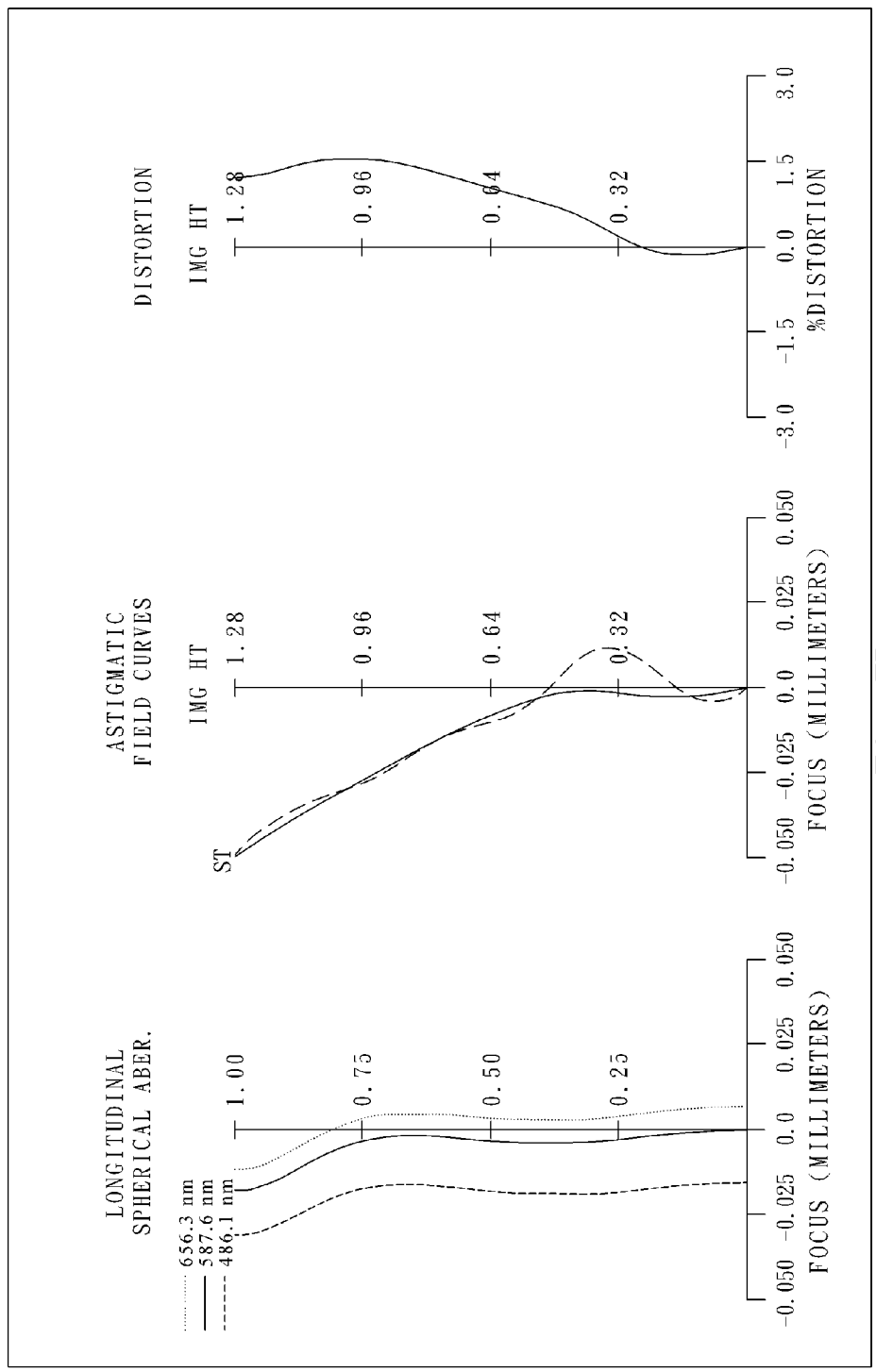
FIG. 7B shows the aberration curves of the seventh embodiment of the present invention.

FIG. 7A shows an optical image capturing lens assembly in accordance with a seventh embodiment of the present invention, and FIG. 7B shows the aberration curves of the seventh embodiment of the present invention. The optical image capturing lens assembly of the seventh embodiment of the present invention mainly comprises four lens elements, in order from an object side to an image side:

a plastic first lens element 710 with positive refractive power having a convex object-side surface 711 and a concave image-side surface 712, the object-side and image-side surfaces 711 and 712 thereof being aspheric;

a plastic second lens element 720 with negative refractive power having a concave object-side surface 721 and a concave image-side surface 722, the object-side and image-side surfaces 721 and 722 thereof being aspheric;

a plastic third lens element 730 with positive refractive power having a concave object-side surface 731 and a convex image-side surface 732, the object-side and image-side surfaces 731 and 732 thereof being aspheric; and a plastic fourth lens element 740 with negative refractive power having a convex object-side surface 741 and a concave image-side surface 742, the object-side and image-side surfaces 741 and 742 thereof being aspheric, at least one inflection point being formed on at least one of the object-side and image-side surfaces 741 and 742 thereof.

The optical image capturing lens assembly is also provided with a stop 700 disposed between an imaged object and the first lens element 710.

The optical image capturing lens assembly further comprises an IR-filter 750 disposed between the image-side surface 742 of the fourth lens element 740 and an image plane 761; the IR-filter 750 is made of glass and has no influence on the focal length of the optical image capturing lens assembly. Moreover, an image sensor 760 is disposed on the image plane 761.

The detailed optical data of the seventh embodiment is shown in TABLE 18, and the aspheric surface data is shown in TABLE 19, wherein the units of the curvature radius, the thickness and the focal length are expressed in mm, and HFOV is half of the maximal field of view.

TABLE 18

(Embodiment 7)
f = 1.82 mm, Fno = 2.08, HFOV = 35.1 deg.

| Surface # | | Curvature radius | Thickness | Material | Refractive Index | Abbe # | Focal Length |
|---|---|---|---|---|---|---|---|
| 0 | Object | Plano | Infinity | | | | |
| 1 | Stop | Plano | −0.140 | | | | |
| 2 | Lens 1 | 0.743480 (ASP) | 0.365 | Plastic | 1.544 | 55.9 | 1.89 |
| 3 | | 2.226850 (ASP) | 0.162 | | | | |
| 4 | Lens 2 | −100.000000 (ASP) | 0.200 | Plastic | 1.640 | 23.3 | −6.20 |
| 5 | | 4.135900 (ASP) | 0.146 | | | | |
| 6 | Lens 3 | −2.652670 (ASP) | 0.418 | Plastic | 1.544 | 55.9 | 0.82 |
| 7 | | −0.404380 (ASP) | 0.038 | | | | |
| 8 | Lens 4 | 100.000000 (ASP) | 0.200 | Plastic | 1.544 | 55.9 | −0.79 |
| 9 | | 0.425230 (ASP) | 0.300 | | | | |
| 10 | IR-filter | Plano | 0.200 | Glass | 1.516 | 64.1 | — |
| 11 | | Plano | 0.224 | | | | |
| 12 | Image Plane | Plano | — | | | | |

* Reference Wavelength is d-line 587.6 nm

TABLE 19

Aspheric Coefficients

| Surface # | 2 | 3 | 4 | 5 |
|---|---|---|---|---|
| k = | −4.11680E−01 | −3.55182E−01 | 1.00000E+00 | 5.00000E+01 |
| A4 = | 1.98137E−01 | 1.99304E−01 | −2.32416E−01 | 1.99956E−01 |
| A6 = | 4.70461E−01 | 1.49672E+00 | −3.43927E+00 | −2.89399E+00 |
| A8 = | 1.22314E+00 | −8.78070E+00 | 6.58690E+00 | 5.22238E+00 |
| A10 = | 5.27564E+00 | 7.14576E+01 | 8.56721E+01 | |
| A12 = | | | −2.20165E+02 | |

| Surface # | 6 | 7 | 8 | 9 |
|---|---|---|---|---|
| k = | 2.24580E+01 | −4.22861E+00 | 1.00000E+00 | −7.38210E+00 |
| A4 = | 6.69439E−01 | −6.52138E−01 | −1.91545E+00 | −1.23744E+00 |
| A6 = | −1.56748E+00 | 1.25802E+00 | 7.82245E+00 | 3.76923E+00 |
| A8 = | 4.54284E+01 | 1.79997E+01 | −1.80499E+01 | −8.56269E+00 |
| A10 = | −3.93548E+02 | −4.33713E+01 | 2.79175E+01 | 1.28034E+01 |
| A12 = | 1.62067E+03 | −3.15132E+01 | −2.76037E+01 | −1.21136E+01 |
| A14 = | −3.42478E+03 | 1.63717E+02 | 1.54821E+01 | 6.47600E+00 |
| A16 = | 2.81220E+03 | −1.20649E+02 | −3.72149E+00 | −1.45981E+00 |

The equation of the aspheric surface profiles of the seventh embodiment has the same form as that of the first embodiment. Moreover, the definitions of the parameters of the relations are the same as those set forth in the first embodiment, but the values of the relations of the seventh embodiment are listed in TABLE 20 below:

TABLE 20

(Embodiment 7)

| f | 1.82 |
|---|---|
| FNO | 2.08 |
| HFOV | 35.1 |
| V1 − V2 | 32.6 |

TABLE 20-continued (Embodiment 7)

| CTmax [mm] | 0.42 |
|---|---|
| CTmin [mm] | 0.20 |
| CT2 + CT4 [mm] | 0.400 |
| Td [mm] | 1.53 |

TABLE 20-continued (Embodiment 7)

| (R1 + R2)/(R1 − R2) | −2.00 |
|---|---|
| |f/R7| | 0.02 |
| f3/f | 0.45 |
| f4/f | −0.43 |
| SD/Td | 0.91 |

Embodiment 8

Figure 8A:
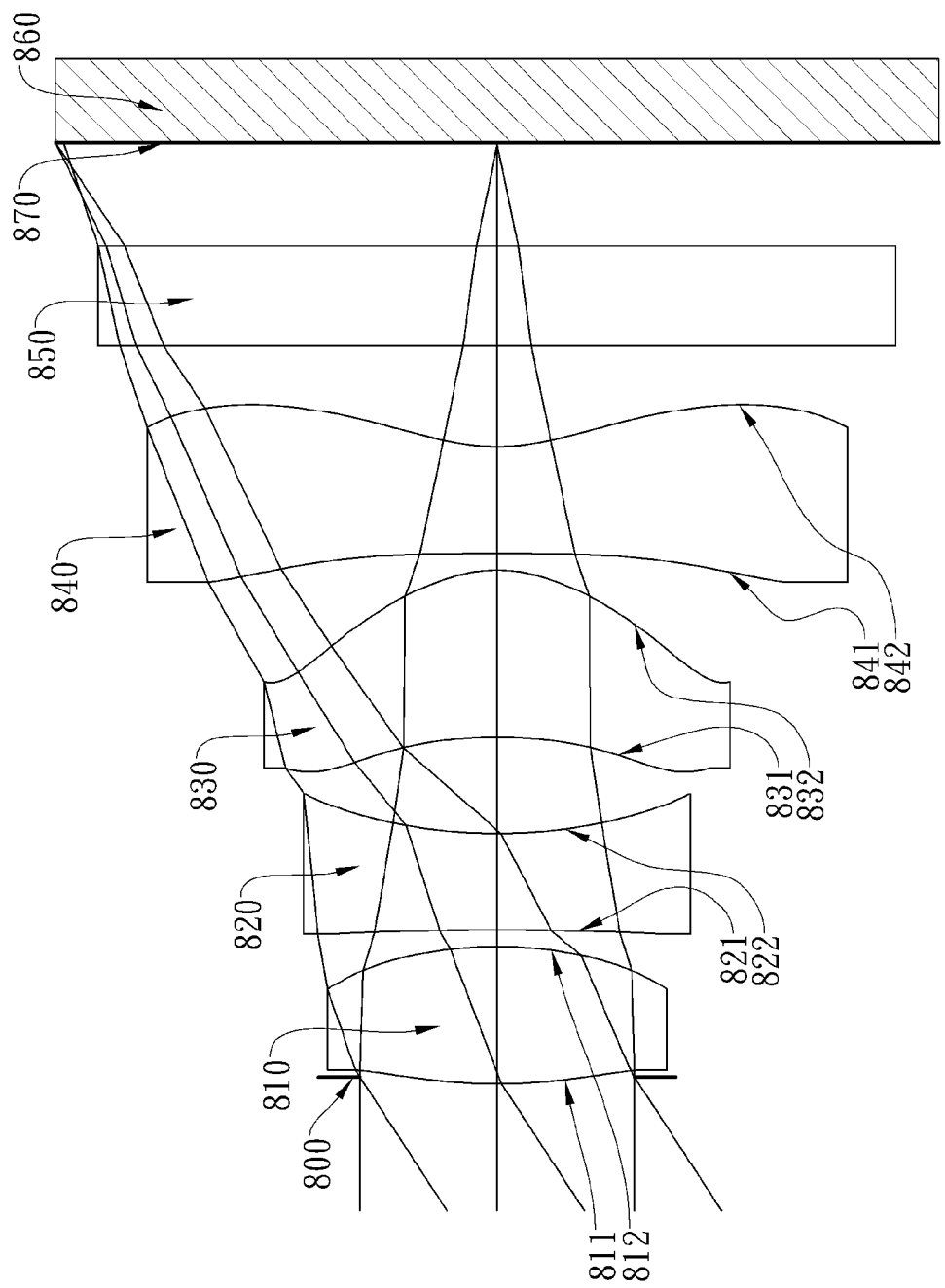
FIG. 8A shows an optical image capturing lens assembly in accordance with an eighth embodiment of the present invention.
Figure 8B:
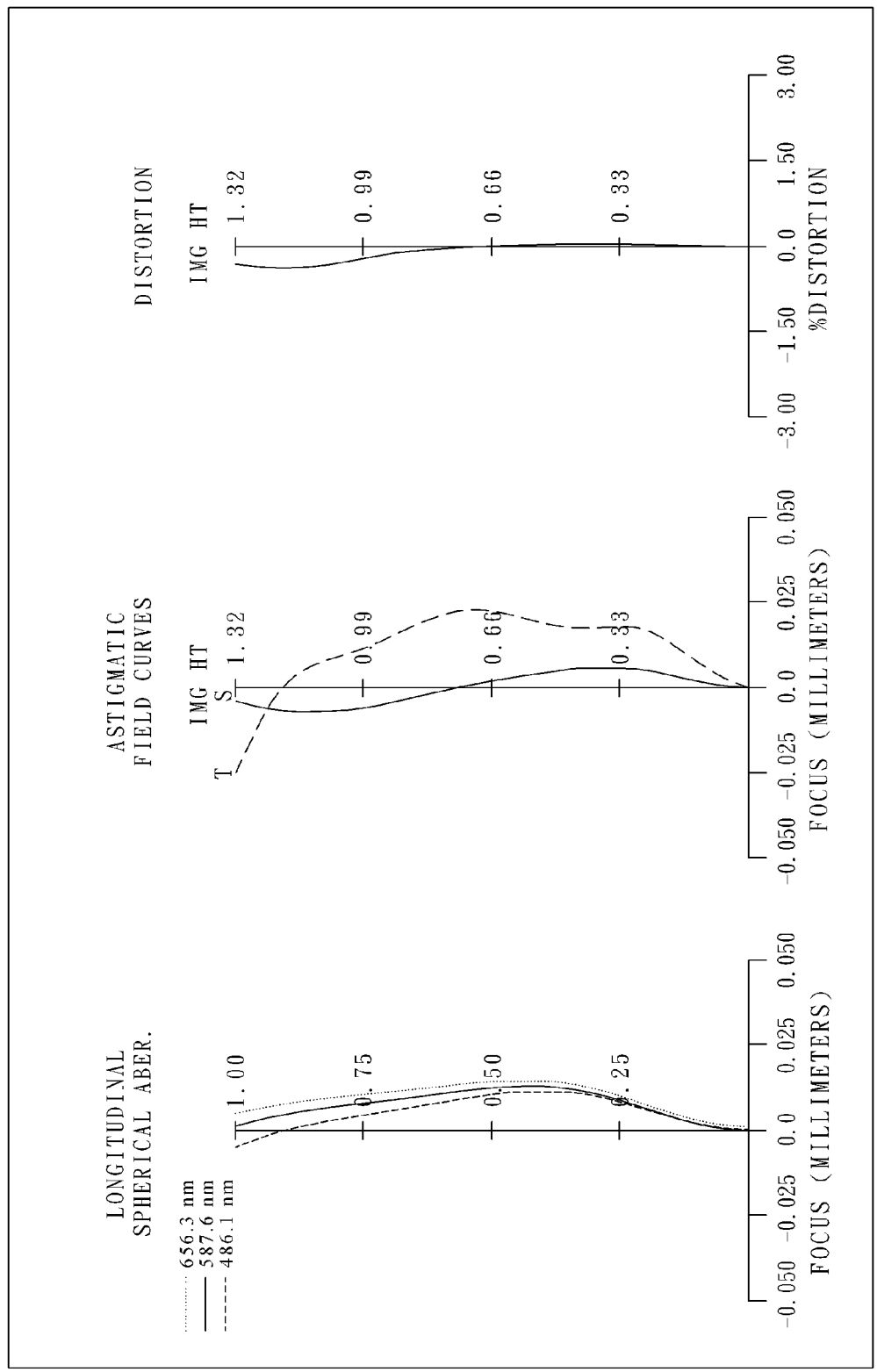
FIG. 8B shows the aberration curves of the eighth embodiment of the present invention.

FIG. 8A shows an optical image capturing lens assembly in accordance with an eighth embodiment of the present invention, and FIG. 8B shows the aberration curves of the eighth embodiment of the present invention. The optical image capturing lens assembly of the eighth embodiment of the present invention mainly comprises four lens elements, in order from an object side to an image side:

a plastic first lens element 810 with positive refractive power having a convex object-side surface 811 and a convex image-side surface 812, the object-side and image-side surfaces 811 and 812 thereof being aspheric;

a plastic second lens element 820 with negative refractive power having a concave object-side surface 821 and a concave image-side surface 822, the object-side and image-side surfaces 821 and 822 thereof being aspheric;

a plastic third lens element 830 with positive refractive power having a concave object-side surface 831 and a convex image-side surface 832, the object-side and image-side surfaces 831 and 832 thereof being aspheric; and a plastic fourth lens element 840 with negative refractive power having a concave object-side surface 841 and a concave image-side surface 842, the object-side and image-side surfaces 841 and 842 thereof being aspheric, at least one inflection point being formed on at least one of the object-side and image-side surfaces 841 and 842 thereof.

The optical image capturing lens assembly is also provided with a stop 800 disposed between an imaged object and the first lens element 810.

The optical image capturing lens assembly further comprises an IR-filter 850 disposed between the image-side surface 842 of the fourth lens element 840 and an image plane 861; the IR-filter 850 is made of glass and has no influence on the focal length of the optical image capturing lens assembly. Moreover, an image sensor 860 is disposed on the image plane 861.

The detailed optical data of the eighth embodiment is shown in TABLE 21, and the aspheric surface data is shown in TABLE 22, wherein the units of the curvature radius, the thickness and the focal length are expressed in mm, and HFOV is half of the maximal field of view.

TABLE 21

(Embodiment 8)
f = 2.03 mm, Fno = 2.47, HFOV = 33.1 deg.

| Surface # | | Curvature radius | Thickness | Material | Refractive Index | Abbe # | Focal Length |
|---|---|---|---|---|---|---|---|
| 0 | Object | Plano | Infinity | | | | |
| 1 | Stop | Plano | −0.020 | | | | |
| 2 | Lens 1 | 1.636440 (ASP) | 0.410 | Plastic | 1.544 | 55.9 | 1.33 |
| 3 | | −1.183640 (ASP) | 0.050 | | | | |
| 4 | Lens 2 | −6.937700 (ASP) | 0.290 | Plastic | 1.634 | 23.8 | −2.00 |
| 5 | | 1.575780 (ASP) | 0.287 | | | | |
| 6 | Lens 3 | −1.326580 (ASP) | 0.500 | Plastic | 1.544 | 55.9 | 1.02 |
| 7 | | −0.443610 (ASP) | 0.050 | | | | |
| 8 | Lens 4 | −81.967200 (ASP) | 0.321 | Plastic | 1.530 | 55.8 | −1.08 |
| 9 | | 0.578600 (ASP) | 0.300 | | | | |
| 10 | IR-filter | Plano | 0.300 | Glass | 1.516 | 64.1 | — |
| 11 | | Plano | 0.310 | | | | |
| 12 | Image Plane | Plano | — | | | | |

* Reference Wavelength is d-line 587.6 nm

TABLE 22

| Aspheric Coefficients | | | | |
|---|---|---|---|---|
| Surface # | 2 | 3 | 4 | 5 |
| k = | −4.63294E+00 | −2.47945E+01 | 8.57803E+01 | −1.06905E+01 |
| A4 = | −1.50737E−01 | −1.06388E+00 | 7.76085E−01 | 4.71841E−01 |
| A6 = | −8.49213E−01 | 1.60885E+00 | −7.32485E+00 | −2.21960E+00 |
| A8 = | −4.90030E−01 | −6.02775E+00 | 3.60153E+01 | 8.13537E+00 |
| A10 = | −8.61185E+00 | 6.11792E+00 | −9.46959E+01 | −8.72953E+00 |
| A12 = | | | 1.10315E+02 | |
| Surface # | 6 | 7 | 8 | 9 |
| k = | −2.83924E−02 | −3.48968E+00 | −9.00000E+01 | −8.01939E+00 |
| A4 = | −8.88681E−02 | −1.19041E+00 | −4.72397E−01 | −4.97947E−01 |
| A6 = | −1.83895E+00 | 2.66234E+00 | 6.62598E−01 | 7.57780E−01 |
| A8 = | 1.38118E+01 | −3.61996E+00 | −2.69361E−01 | −9.37072E−01 |
| A10 = | −7.79581E+01 | −3.91074E+00 | −1.21140E−01 | 6.06489E−01 |
| A12 = | 4.62536E+02 | 2.28557E+01 | −4.03720E−02 | −8.00114E−02 |
| A14 = | −1.14086E+03 | 1.97434E+01 | 3.27788E−01 | −1.25309E−01 |
| A16 = | 9.43168E+02 | −5.77980E+01 | −1.70769E−01 | 5.13624E−02 |

The equation of the aspheric surface profiles of the eighth embodiment has the same form as that of the first embodiment. Moreover, the definitions of the parameters of the relations are the same as those set forth in the first embodiment, but the values of the relations of the eighth embodiment are listed in TABLE 23 below:

TABLE 23

(Embodiment 8)

| | |
|---|---|
| f | 2.03 |
| FNO | 2.47 |
| HFOV | 33.1 |
| V1 − V2 | 32.1 |
| CTmax [mm] | 0.50 |
| CTmin [mm] | 0.29 |
| CT2 + CT4 [mm] | 0.611 |
| Td [mm] | 1.91 |
| (R1 + R2)/(R1 − R2) | 0.16 |
| |f/R7| | 0.02 |
| f3/f | 0.50 |
| f4/f | −0.53 |
| SD/Td | 0.99 |

Embodiment 9

Figure 9A:
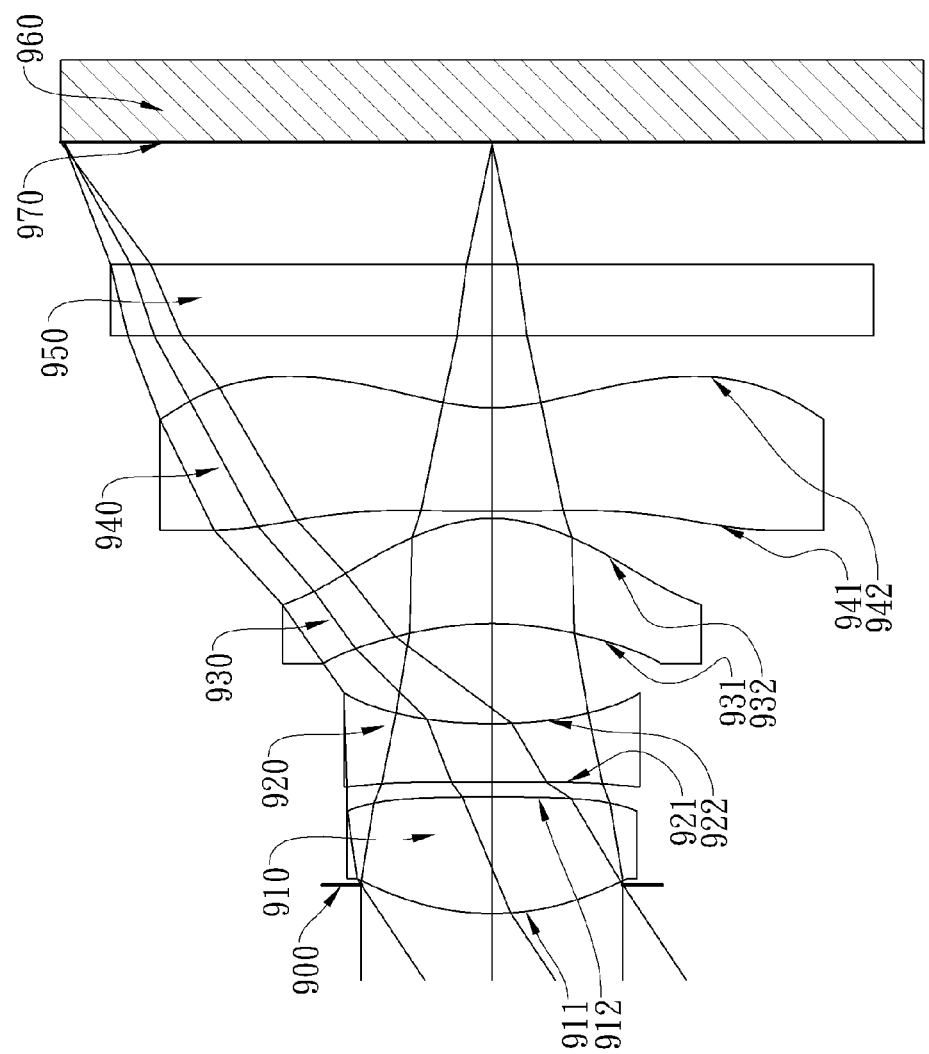
FIG. 9A shows an optical image capturing lens assembly in accordance with a ninth embodiment of the present invention.
Figure 9B:
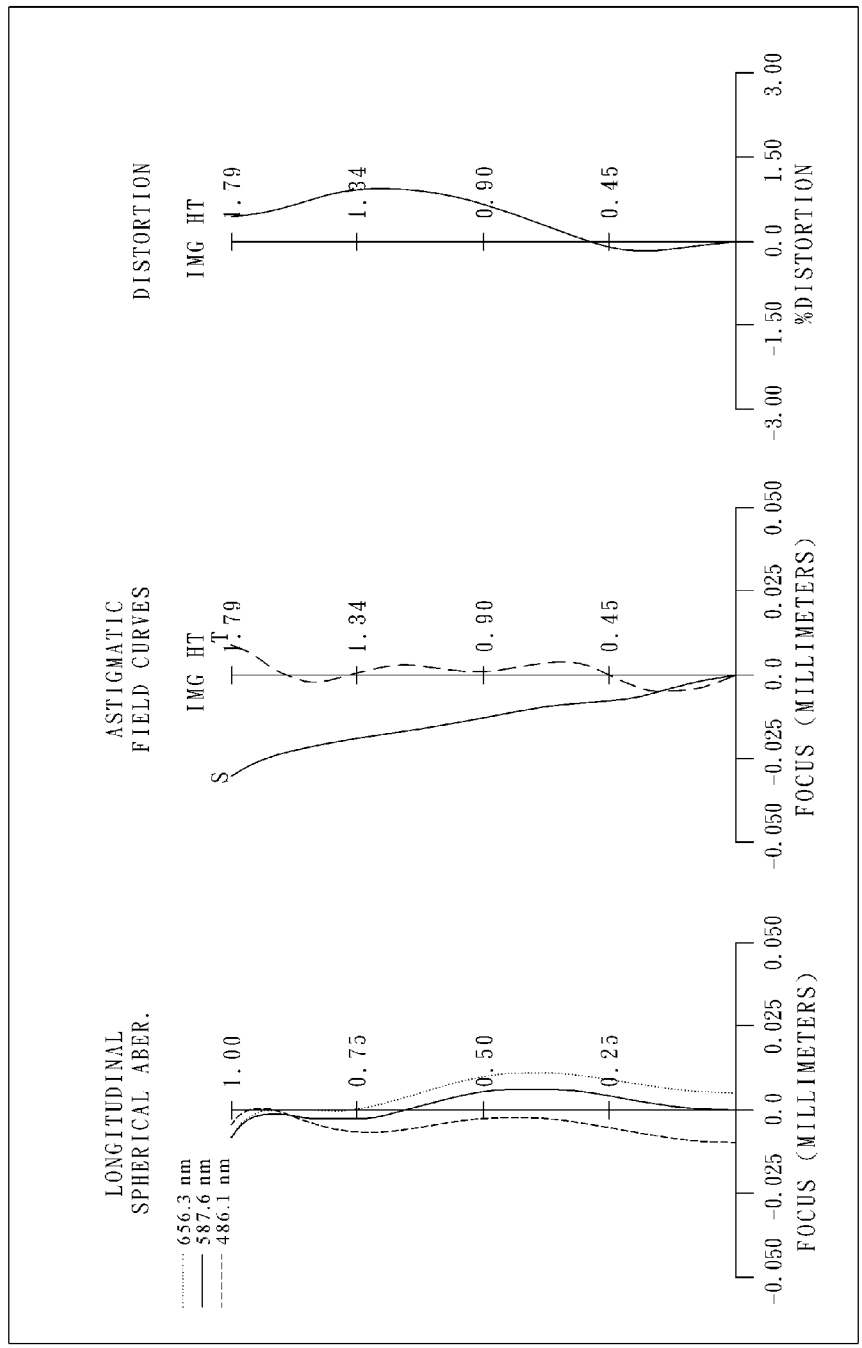
FIG. 9B shows the aberration curves of the ninth embodiment of the present invention.

FIG. 9A shows an optical image capturing lens assembly in accordance with a ninth embodiment of the present invention, and FIG. 9B shows the aberration curves of the ninth embodiment of the present invention. The optical image capturing lens assembly of the ninth embodiment of the present invention mainly comprises four lens elements, in order from an object side to an image side:

a plastic first lens element 910 with positive refractive power having a convex object-side surface 911 and a convex image-side surface 912, the object-side and image-side surfaces 911 and 912 thereof being aspheric;

a plastic second lens element 920 with negative refractive power having a concave object-side surface 921 and a concave image-side surface 922, the object-side and image-side surfaces 921 and 922 thereof being aspheric;

a plastic third lens element 930 with positive refractive power having a concave object-side surface 931 and a convex image-side surface 932, the object-side and image-side surfaces 931 and 932 thereof being aspheric; and a plastic fourth lens element 940 with negative refractive power having a convex object-side surface 941 and a concave image-side surface 942, the object-side and image-side surfaces 941 and 942 thereof being aspheric, at least one inflection point being formed on at least one of the object-side and image-side surfaces 941 and 942 thereof.

The optical image capturing lens assembly is also provided with a stop 900 disposed between an imaged object and the first lens element 910.

The optical image capturing lens assembly further comprises an IR-filter 950 disposed between the image-side surface 942 of the fourth lens element 940 and an image plane 961; the IR-filter 950 is made of glass and has no influence on the focal length of the optical image capturing lens assembly. Moreover, an image sensor 960 is disposed on the image plane 961.

The detailed optical data of the ninth embodiment is shown in TABLE 24, and the aspheric surface data is shown in TABLE 25, wherein the units of the curvature radius, the thickness and the focal length are expressed in mm, and HFOV is half of the maximal field of view.

TABLE 24

(Embodiment 9)
f = 2.68 mm, Fno = 2.45, HFOV = 33.6 deg.

| Surface # | | Curvature radius | Thickness | Material | Refractive Index | Abbe # | Focal Length |
|---|---|---|---|---|---|---|---|
| 0 | Object | Plano | Infinity | | | | |
| 1 | Stop | Plano | −0.120 | | | | |
| 2 | Lens 1 | 1.097900 (ASP) | 0.489 | Plastic | 1.544 | 55.9 | 1.85 |
| 3 | | −10.395100 (ASP) | 0.061 | | | | |
| 4 | Lens 2 | −100.000000 (ASP) | 0.246 | Plastic | 1.634 | 23.8 | −3.32 |
| 5 | | 2.155330 (ASP) | 0.419 | | | | |
| 6 | Lens 3 | −1.388550 (ASP) | 0.441 | Plastic | 1.544 | 55.9 | 1.73 |
| 7 | | −0.624700 (ASP) | 0.029 | | | | |
| 8 | Lens 4 | 6.990900 (ASP) | 0.435 | Plastic | 1.544 | 55.9 | −1.72 |
| 9 | | 0.807940 (ASP) | 0.300 | | | | |
| 10 | IR-filter | Plano | 0.300 | Glass | 1.516 | 64.1 | — |
| 11 | | Plano | 0.513 | | | | |
| 12 | Image Plane | Plano | — | | | | |

* Reference Wavelength is d-line 587.6 nm

TABLE 25

Aspheric Coefficients

| Surface # | 2 | 3 | 4 | 5 |
|---|---|---|---|---|
| k = | −3.94608E−01 | 1.00000E+01 | 1.00000E+01 | 7.51887E+00 |
| A4 = | 4.14793E−03 | 3.05774E−02 | 1.56358E−01 | 2.56841E−01 |
| A6 = | −3.40978E−02 | −1.65968E+00 | −1.72785E+00 | −9.83682E−01 |
| A8 = | −4.52248E−02 | 2.82579E+00 | 1.39105E+00 | 1.46537E+00 |
| A10 = | −1.19632E+00 | −2.10765E+00 | 6.09007E+00 | |
| A12 = | | | −7.30986E+00 | |

TABLE 25-continued

| Aspheric Coefficients | | | | |
|---|---|---|---|---|
| Surface # | 6 | 7 | 8 | 9 |
| k = | −5.92194E+00 | −3.56023E+00 | −1.32620E+01 | −9.17540E+00 |
| A4 = | 1.97800E−02 | −2.78827E−01 | −3.05780E−01 | −2.37814E−01 |
| A6 = | −5.59768E−01 | 3.74186E−01 | 1.94350E−01 | 1.68099E−01 |
| A8 = | 2.40564E+00 | −1.83543E−01 | −7.18592E−03 | −1.07037E−01 |
| A10 = | −5.42063E+00 | 4.00056E−01 | −1.17461E−02 | 3.35974E−02 |
| A12 = | 4.14466E+00 | 1.75407E−01 | −4.58997E−03 | 3.21565E−04 |
| A14 = | 3.19450E+00 | −8.37997E−01 | 1.61447E−03 | −3.75036E−03 |
| A16 = | −7.48152E+00 | 3.41791E−01 | 3.06477E−04 | 8.98165E−04 |

The equation of the aspheric surface profiles of the ninth embodiment has the same form as that of the first embodiment. Moreover, the definitions of the parameters of the relations are the same as those set forth in the first embodiment, but the values of the relations of the ninth embodiment are listed in TABLE 26 below:

TABLE 26

| (Embodiment 9) | |
|---|---|
| f | 2.68 |
| FNO | 2.45 |
| HFOV | 33.6 |
| V1 − V2 | 32.1 |
| CTmax [mm] | 0.49 |
| CTmin [mm] | 0.25 |
| CT2 + CT4 [mm] | 0.681 |
| Td [mm] | 2.12 |
| (R1 + R2)/(R1 − R2) | −0.81 |
| |f/R7| | 0.38 |
| f3/f | 0.65 |
| f4/f | −0.64 |
| SD/Td | 0.94 |

It is to be noted that TABLES 1-26 show different data of the different embodiments, however, the data of the different embodiments are obtained from experiments. Therefore, any optical image capturing lens assembly of the same structure is considered to be within the scope of the present invention even if it uses different data. The embodiments depicted above and the appended drawings are exemplary and are not intended to limit the scope of the present invention.

What is claimed is:

1. An optical image capturing lens assembly comprising four lens elements, in order from an object side to an image side:
    a first lens element with positive refractive power having a convex object-side surface;
    a plastic second lens element with negative refractive power and a concave image-side surface, wherein at least one of an object-side surface and the image-side surface thereof is aspheric;
    a plastic third lens element with positive refractive power having a concave object-side surface and a convex image-side surface, the object-side and image-side surfaces thereof being aspheric; and
    a plastic fourth lens element with negative refractive power, an object-side surface and an image-side surface thereof being aspheric, the image-side surface being concave, at least one inflection point being formed on at least one of the object-side and image-side surfaces thereof;
    the optical image capturing lens assembly further comprises a stop; wherein an axial distance between the object-side surface of the first lens element and the image-side surface of the fourth lens element is Td, a curvature radius of the object-side surface of the first lens element is R1, a curvature radius of an image-side surface of the first lens element is R2, an axial distance between the stop and the image-side surface of the fourth lens element is SD, and they satisfy the following relations: 1.25 mm<Td<1.75 mm; −4.0<(R1+R2)/(R1−R2)<−1.3; and 0.85<SD/Td<1.1.

2. The optical image capturing lens assembly according to claim 1, wherein an Abbe number of the first lens element is V1, an Abbe number of the second lens element is V2, and they satisfy the following relation: 30<V1−V2<45.

3. The optical image capturing lens assembly according to claim 1, wherein a focal length of the optical image capturing lens assembly is f, a focal length of the third lens element is f3, a focal length of the fourth lens element is f4, and they satisfy the following relations: 0.2<f3/f<0.65; and −0.65<f4/f<−0.2.

4. The optical image capturing lens assembly according to claim 3, wherein the focal length of the optical image capturing lens assembly is f, the focal length of the third lens element is f3, the focal length of the fourth lens element is f4, and they satisfy the following relations: 0.2<f3/f<0.5; and −0.5<f4/f<−0.2.

5. The optical image capturing lens assembly according to claim 1, wherein the curvature radius of the object-side surface of the first lens element is R1, the curvature radius of the image-side surface of the first lens element is R2, and they satisfy the following relation: −3.0<(R1+R2)/(R1−R2)<−1.65.

6. The optical image capturing lens assembly according to claim 1, wherein an axial thickness of the second lens element is CT2, an axial thickness of the fourth lens element is CT4, and they satisfy the following relation: 0.2 mm<CT2+CT4<0.46 mm.

7. The optical image capturing lens assembly according to claim 1, wherein the focal length of the optical image capturing lens assembly is f, a curvature radius of the object-side surface of the fourth lens element is R7, and they satisfy the following relation: |f/R7|<0.25.

8. The optical image capturing lens assembly according to claim 1, wherein the focal length of the optical image capturing lens assembly is f, and it satisfies the following relation: 1.5 mm<f<2.2 mm.

9. An optical image capturing lens assembly comprising four lens elements, in order from an object side to an image side:
    a first lens element with positive refractive power having a convex object-side surface;
    a plastic second lens element with negative refractive power, at least one of an object-side surface and an image-side surface thereof being aspheric;
    a plastic third lens element with positive refractive power having a concave object-side surface and a convex image-side surface, the object-side and image-side surfaces thereof being aspheric; and a plastic fourth lens element with negative refractive power having a concave image-side surface, an object-side surface and the image-side surface thereof being aspheric, at least one inflection point being formed on at least one of the object-side and image-side surfaces thereof;

wherein a maximum central thickness of individual lens elements of the optical image capturing lens assembly is CTmax, a minimum central thickness of individual lens elements of the optical image capturing lens assembly is CTmin, a curvature radius of the object-side surface of the first lens element is R1, a curvature radius of an image-side surface of the first lens element is R2, and they satisfy the following relations: 0.25 mm<CTmax<0.50 mm; 0.11 mm<CTmin<0.25 mm; and −4.0<(R1+R2)/(R1−R2)<−1.3.

10. The optical image capturing lens assembly according to claim 9, wherein a focal length of the optical image capturing lens assembly is f, a focal length of the third lens element is f3, a focal length of the fourth lens element is f4, and they satisfy the following relations: 0.2<f3/f<0.65; and −0.65<f4/f<−0.2.

11. The optical image capturing lens assembly according to claim 9, wherein an Abbe number of the first lens element is V1, an Abbe number of the second lens element is V2, and they satisfy the following relation: 30<V1−V2<42.

12. The optical image capturing lens assembly according to claim 9, wherein the focal length of the optical image capturing lens assembly is f, a curvature radius of the object-side surface of the fourth lens element is R7, and they satisfy the following relation: |f/R7|<0.25.

13. The optical image capturing lens assembly according to claim 9, wherein the focal length of the optical image capturing lens assembly is f, and it satisfies the following relation: 1.5 mm<f<2.2 mm.

14. An optical image capturing lens assembly comprising four lens elements, in order from an object side to an image side:

a first lens element with positive refractive power having a convex object-side surface;

a plastic second lens element with negative refractive power, at least one of an object-side surface and an image-side surface thereof being aspheric;

a plastic third lens element with positive refractive power having a concave object-side surface and a convex image-side surface, the object-side and image-side surfaces thereof being aspheric; and a plastic fourth lens element with negative refractive power having a concave image-side surface, an object-side surface and the image-side surface thereof being aspheric, at least one inflection point being formed on at least one of the object-side and image-side surfaces thereof;

wherein an axial distance between the object-side surface of the first lens element and the image-side surface of the fourth lens element is Td, a focal length of the optical image capturing lens assembly is f, a focal length of the third lens element is f3, a focal length of the fourth lens element is f4, a curvature radius of the object-side surface of the fourth lens element is R7, and they satisfy the following relations: 1.3 mm<Td<1.6 mm; 0.2<f3/f<0.65; −0.65<f4/f<−0.2; and |f/R7|<0.25.

15. The optical image capturing lens assembly according to claim 14, wherein a curvature radius of the object-side surface of the first lens element is R1, a curvature radius of an image-side surface of the first lens element is R2, and they satisfy the following relation: −4.0<(R1+R2)/(R1−R2)<−1.3.

16. The optical image capturing lens assembly according to claim 14, wherein an axial thickness of the second lens element is CT2, an axial thickness of the fourth lens element is CT4, and they satisfy the following relation: 0.2 mm<CT2+CT4<0.46 mm.

17. The optical image capturing lens assembly according to claim 14, wherein an Abbe number of the first lens element is V1, an Abbe number of the second lens element is V2, and they satisfy the following relation: 30<V1−V2<42.

18. The optical image capturing lens assembly according to claim 14, wherein the focal length of the optical image capturing lens assembly is f, and it satisfies the following relation: 1.5 mm<f<2.2 mm.

19. An optical image capturing lens assembly comprising four lens elements, in order from an object side to an image side:

a first lens element with positive refractive power having a convex object-side surface;

a plastic second lens element with negative refractive power, at least one of an object-side surface and an image-side surface thereof being aspheric;

a plastic third lens element with positive refractive power having a concave object-side surface and a convex image-side surface, the object-side and image-side surfaces thereof being aspheric; and a plastic fourth lens element with negative refractive power having a concave image-side surface, an object-side surface and the image-side surface thereof being aspheric, at least one inflection point being formed on at least one of the object-side and image-side surfaces thereof;

wherein an axial distance between the object-side surface of the first lens element and the image-side surface of the fourth lens element is Td, a focal length of the optical image capturing lens assembly is f, a curvature radius of the object-side surface of the fourth lens element is R7, and they satisfy the following relations: 1.3 mm<Td<1.6 mm; |f/R7|<0.25; and 1.5 mm<f<2.2 mm.

20. The optical image capturing lens assembly according to claim 19, wherein a curvature radius of the object-side surface of the first lens element is R1, a curvature radius of an image-side surface of the first lens element is R2, and they satisfy the following relation: −4.0<(R1+R2)/(R1−R2)<−1.3.

21. The optical image capturing lens assembly according to claim 19, wherein an axial thickness of the second lens element is CT2, an axial thickness of the fourth lens element is CT4, and they satisfy the following relation: 0.2 mm<CT2+CT4<0.46 mm.

22. The optical image capturing lens assembly according to claim 19, wherein an Abbe number of the first lens element is V1, an Abbe number of the second lens element is V2, and they satisfy the following relation: 30<V1−V2<42.

* * * * *